United States Patent
Prabhudesai et al.

(10) Patent No.: US 11,870,694 B2
(45) Date of Patent: Jan. 9, 2024

(54) NETWORK PREFIX-GENERATING CUSTOMER PREMISES EQUIPMENT

(71) Applicant: QUALCOMM Incorporated, San Diego, CA (US)

(72) Inventors: Prathamesh Prakash Prabhudesai, San Diego, CA (US); Gaurav Gopal Kathuria, San Diego, CA (US); Rohit Tripathi, San Diego, CA (US); Reddy Surendra Prasad Bangalore Venkataswamy, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 140 days.

(21) Appl. No.: 17/455,882

(22) Filed: Nov. 19, 2021

(65) Prior Publication Data

US 2023/0164072 A1 May 25, 2023

(51) Int. Cl.
*H04L 45/74* (2022.01)
*H04L 61/256* (2022.01)
*H04W 28/06* (2009.01)
*H04L 61/2514* (2022.01)
*H04L 61/5038* (2022.01)
*H04L 61/5092* (2022.01)
*H04L 61/5014* (2022.01)

(52) U.S. Cl.
CPC ............ *H04L 45/74* (2013.01); *H04L 61/256* (2013.01); *H04W 28/06* (2013.01)

(58) Field of Classification Search
CPC ..... H04L 45/74; H04L 45/741; H04L 61/256; H04L 61/25; H04W 28/02; H04W 28/06
See application file for complete search history.

(56) References Cited

U.S. PATENT DOCUMENTS

| 6,766,505 B1* | 7/2004 | Rangan | H03K 19/17758 326/39 |
| 7,526,603 B1* | 4/2009 | Abdollahi-Alibeik | G11C 15/00 711/216 |
| 8,681,695 B1* | 3/2014 | Krishnan | H04L 61/5014 370/395.54 |
| 9,654,331 B1* | 5/2017 | Singh | H04L 69/329 |
| 9,756,013 B2* | 9/2017 | Asati | H04L 61/251 |
| 10,880,743 B1* | 12/2020 | Berzin | H04L 41/0806 |

(Continued)

OTHER PUBLICATIONS

Baker F., et al., "IPv6 Prefix Assignment in Small Networks draft-baker-homenet-prefix-assignment-01", Internet Engineering Task Force, IETF, Standardworkingdraft, Internet Society (ISOC) 4, Rue Des Falaises CH—1205 Geneva, Switzerland, Mar. 8, 2012, pp. 1-11, XP015081578, Sections 1 and 3 (Including Sub-Sections).

(Continued)

*Primary Examiner* — Jenee Holland
(74) *Attorney, Agent, or Firm* — Procopio, Cory, Hargreaves & Savitch LLP

(57) ABSTRACT

A CPE receives, over a first connection with a wireless network, a network-assigned prefix for the CPE. The CPE creates a prefix based on a subset of bits from the network assigned prefix. The CPE transmits, over a second connection with a LAN router device, the prefix created by the CPE as a WAN prefix for the LAN router device and the network assigned prefix as a LAN prefix for the LAN router device.

30 Claims, 11 Drawing Sheets

(56) References Cited

U.S. PATENT DOCUMENTS

| | | | | |
|---|---|---|---|---|
| 2001/0036161 | A1* | 11/2001 | Eidenschink | H04B 7/18584 370/468 |
| 2004/0019664 | A1* | 1/2004 | Le | H04L 61/10 709/220 |
| 2004/0165602 | A1* | 8/2004 | Park | H04L 61/2532 370/466 |
| 2005/0044068 | A1* | 2/2005 | Lin | H04L 63/164 |
| 2006/0153230 | A1* | 7/2006 | Miyata | H04L 69/167 370/466 |
| 2011/0317673 | A1* | 12/2011 | Shelby | H04W 4/14 370/338 |
| 2012/0057595 | A1* | 3/2012 | Awano | H04L 63/0421 370/392 |
| 2013/0191257 | A1* | 7/2013 | Koodli | H04L 12/4633 709/217 |
| 2013/0222159 | A1* | 8/2013 | Nesiolovskiy | H03M 7/40 341/51 |
| 2014/0215087 | A1* | 7/2014 | Zhao | H04W 80/04 709/231 |
| 2015/0280878 | A1* | 10/2015 | Lee | H04L 5/0048 370/252 |
| 2015/0326302 | A1* | 11/2015 | Stojanovski | H04W 12/80 370/315 |
| 2016/0036768 | A1* | 2/2016 | Pratapa | H04L 61/5007 709/245 |
| 2016/0036772 | A1* | 2/2016 | Pratapa | H04L 61/5038 709/245 |
| 2016/0065536 | A1* | 3/2016 | Aoshima | H04L 61/2514 370/392 |
| 2017/0250910 | A1* | 8/2017 | Sutter | H04L 61/251 |
| 2018/0054415 | A1* | 2/2018 | Liang | H04L 61/5014 |
| 2018/0359214 | A1* | 12/2018 | Janneteau | H04L 61/256 |
| 2019/0036875 | A1* | 1/2019 | Jiménez | H04L 61/5014 |
| 2019/0149509 | A1* | 5/2019 | Albrecht | H04L 61/4511 709/223 |
| 2020/0153789 | A1* | 5/2020 | Nalluri | H04W 76/11 |

OTHER PUBLICATIONS

International Search Report and Written Opinion—PCT/US2022/047174—ISA/EPO—dated Jan. 30, 2023.
Junos: "Broadband Subscriber Sessions User Guide", Juniper Network, Apr. 18, 2021, 2873 Pages, XP093014323, p. 607-648.
Singh H., et al., "Advanced Requirements for IPv6 Customer Edge Routers draft-wbeebee-v6ops-ipv6-cpe-router-bis-03", Internet Engineering Task Force, IETF, Standardworkingdraft, Internet Society (ISOC) 4, Rue Des Falaises CH—1205 Geneva, Switzerland, No. 3, Jul. 8, 2010, pp. 1-13, XP015069834, Sections (Including Sub-Sections) 1 and 4, In Particular Section 4.3.

* cited by examiner

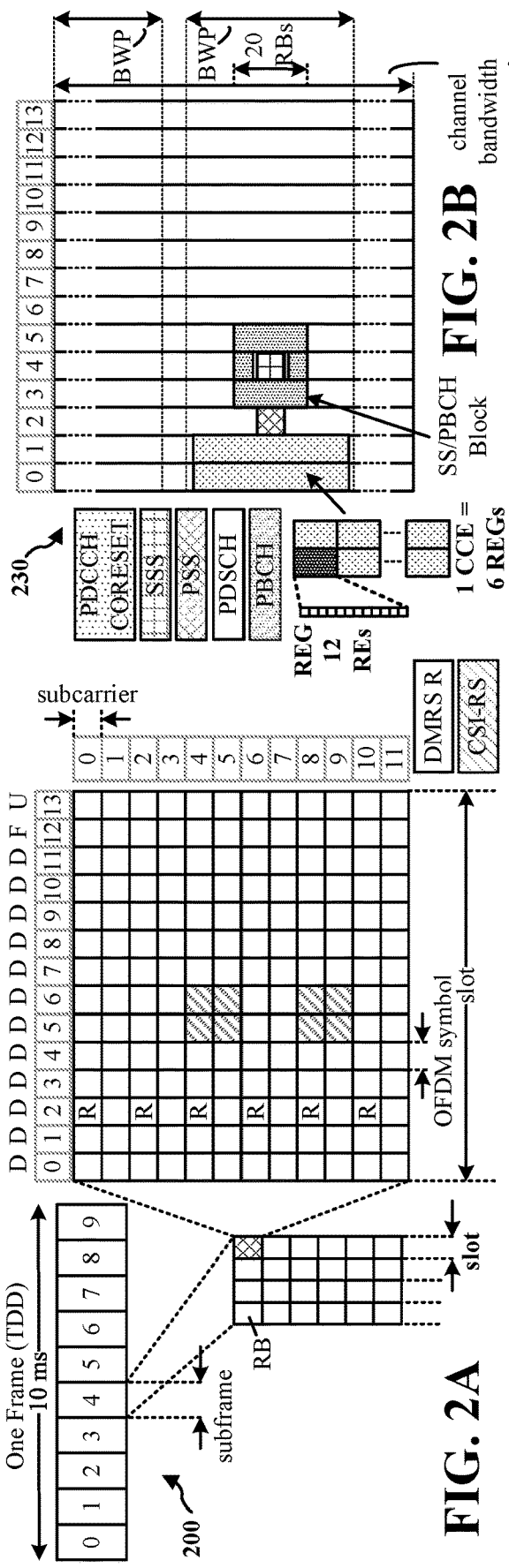
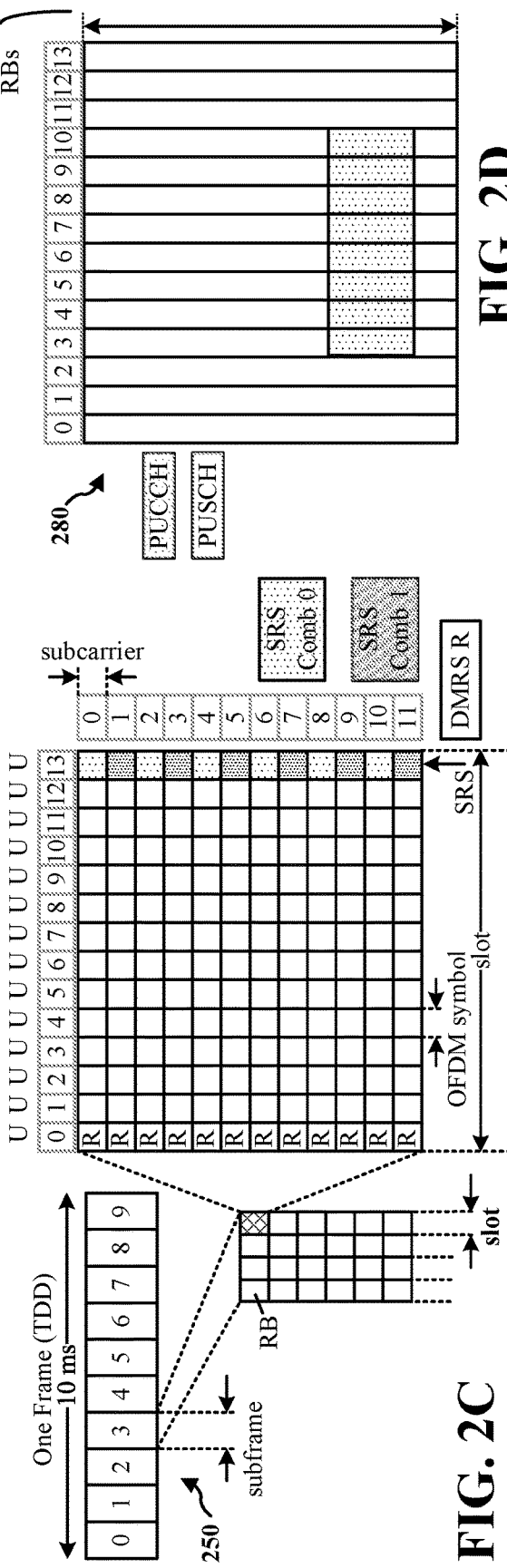
FIG. 2A
FIG. 2B
FIG. 2C
FIG. 2D

NETWORK PREFIX-GENERATING CUSTOMER PREMISES EQUIPMENT

INTRODUCTION

The present disclosure relates generally to communication systems, and more particularly, to customer premises equipment that supports prefix sharing for connected devices.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method of wireless communication at a customer premises equipment (CPE) is provided. The method may include receiving, over a first connection with a wireless network, a network-assigned prefix for the CPE; creating a prefix based on a subset of bits from the network assigned prefix; and transmitting, over a second connection with a local area network (LAN) device, the prefix created by the CPE as a wide area network (WAN) prefix for the LAN router device and the network assigned prefix as a LAN prefix for the LAN router device.

In an aspect of the disclosure, a method of wireless communication at a customer premises equipment (CPE) is provided. The method may include receiving, over a first connection with a wireless network, a network-assigned prefix for the CPE; creating a prefix based on a subset of bits from the network assigned prefix; and transmitting, over a second connection with a local area network (LAN) device, the prefix created by the CPE as a wide area network (WAN) prefix for the LAN router device and the network assigned prefix as a LAN prefix for the LAN router device.

In an aspect of the disclosure, an apparatus for wireless communication at a CPE is provided. The apparatus includes memory and at least one processor coupled to the memory, the memory and the at least one processor configured to receive, over a first connection with a wireless network, a network-assigned prefix for the CPE; create a prefix based on a subset of bits from the network assigned prefix; and transmit, over a second connection with a LAN device, the prefix created by the CPE as a WAN prefix for the LAN router device and the network assigned prefix as a LAN prefix for the LAN router device.

In an aspect of the disclosure, an apparatus for wireless communication at a CPE is provided. The apparatus includes means for receiving, over a first connection with a wireless network, a network-assigned prefix for the CPE; means for creating a prefix based on a subset of bits from the network assigned prefix; and means for transmitting, over a second connection with a LAN device, the prefix created by the CPE as a WAN prefix for the LAN router device and the network assigned prefix as a LAN prefix for the LAN router device.

In an aspect of the disclosure, a non-transitory computer-readable medium storing computer executable code for wireless communication at a CPE is provided. The code when executed by a processor causes the processor to receive, over a first connection with a wireless network, a network-assigned prefix for the CPE; create a prefix based on a subset of bits from the network assigned prefix; and transmit, over a second connection with a LAN device, the prefix created by the CPE as a WAN prefix for the LAN router device and the network assigned prefix as a LAN prefix for the LAN router device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
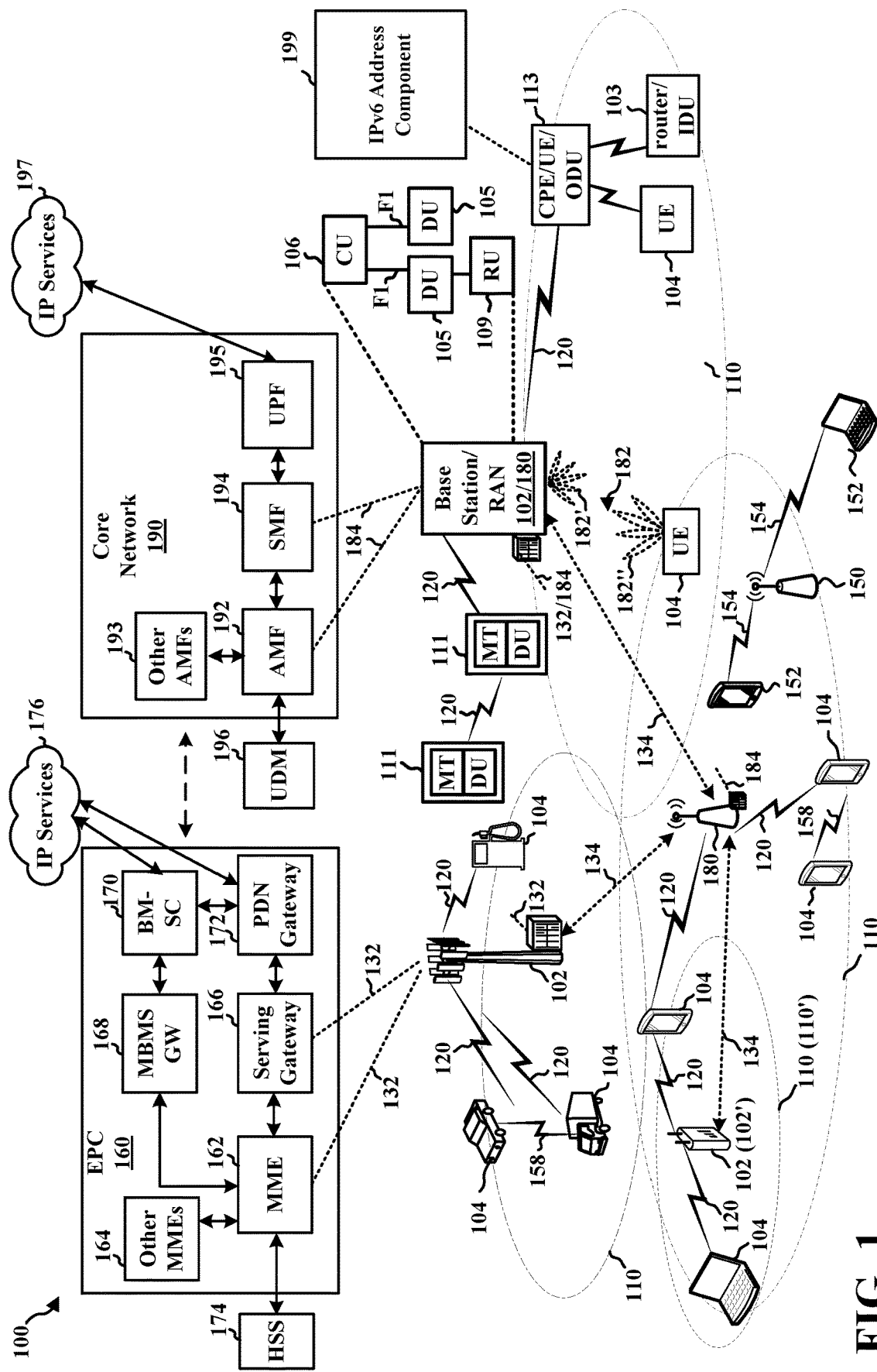
FIG. 1 is a diagram illustrating an example of a wireless communications system and an access network, in accordance with various aspects of the present disclosure.

For connectivity using certain network protocols, some routers may expect a network to support prefix delegation. For example, a wide area network (WAN) interface may delegate a different prefix to devices that connect to it than the WAN interface is assigned, or a system may assign a first prefix for a WAN interface and a second prefix to its local area network (LAN) clients. However, some networks may not be configured to delegate multiple prefixes to customer premises equipment (CPE) that connect to such routers. In some aspects, the CPE may be an ODU, and the LAN device may be an IDU. Aspects presented herein enable a CPE to generate an additional prefix to delegate to a LAN based on a single network-assigned address that is received from a wireless network that does not support prefix delegation. The CPE may generate one or more prefixes that may be delegated to a router, or any other device that connects to the CPE. The generated prefixes may be created based on the network-assigned prefix to prevent traffic from being accidentally dropped and/or prevent possible downlink traffic failure. In some aspects, the CPE may perform Internet Protocol version 6 (IPv6) network address translation (NAT) for the generated prefix(es). By creating one or more dummy network prefixes using a subset of the bits of the network-assigned prefix, the CPE may ensure that any IPv6 addresses assigned to an IDU/router WAN, any prefix assigned to an IDU/router LAN (prefix for delegation), and/or the IPv6 address of the interface on which the server is running (e.g., LAN gateway interface) are all on the same network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Aspects described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described aspects may occur. Implementations may range a spectrum from chip-level or modular components to non-modular, non-chip-level implementations and further to aggregate, distributed, or original equipment manufacturer (OEM) devices or systems incorporating one or more aspects of the described aspects. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that aspects described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for fourth generation (4G) LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., eNB to eNB (X2) interface). The first backhaul links 132, the second backhaul links 184 (e.g., an NG-RAN to NG-RAN (Xn) interface), and the third backhaul links 134 may be wired or wireless.

In some aspects, a base station 102 or 180 may be referred as a RAN and may include aggregated or disaggregated components. As an example of a disaggregated RAN, a base station may include a central unit (CU) 106, one or more distributed units (DU) 105, and/or one or more remote units (RU) 109, as illustrated in FIG. 1. A RAN may be disaggregated with a split between an RU 109 and an aggregated CU/DU. A RAN may be disaggregated with a split between the CU 106, the DU 105, and the RU 109. A RAN may be disaggregated with a split between the CU 106 and an aggregated DU/RU. The CU 106 and the one or more DUs 105 may be connected via an F1 interface. A DU 105 and an RU 109 may be connected via a fronthaul interface. A connection between the CU 106 and a DU 105 may be referred to as a midhaul, and a connection between a DU 105 and an RU 109 may be referred to as a fronthaul. The connection between the CU 106 and the core network may be referred to as the backhaul. The RAN may be based on a functional split between various components of the RAN, e.g., between the CU 106, the DU 105, or the RU 109. The CU may be configured to perform one or more aspects of a wireless communication protocol, e.g., handling one or more layers of a protocol stack, and the DU(s) may be configured to handle other aspects of the wireless communication protocol, e.g., other layers of the protocol stack. In different implementations, the split between the layers handled by the CU and the layers handled by the DU may occur at different layers of a protocol stack. As one, non-limiting example, a DU 105 may provide a logical node to host a radio link control (RLC) layer, a medium access control (MAC) layer, and at least a portion of a physical (PHY) layer based on the functional split. An RU may provide a logical node configured to host at least a portion of the PHY layer and radio frequency (RF) processing. A CU 106 may host higher layer functions, e.g., above the RLC layer, such as a service data adaptation protocol (SDAP) layer, a packet data convergence protocol (PDCP) layer. In other implementations, the split between the layer functions provided by the CU, DU, or RU may be different.

An access network may include one or more integrated access and backhaul (IAB) nodes 111 that exchange wireless communication with a UE 104 or other IAB node 111 to provide access and backhaul to a core network. In an IAB network of multiple IAB nodes, an anchor node may be referred to as an IAB donor. The IAB donor may be a base station 102 or 180 that provides access to a core network 190 or EPC 160 and/or control to one or more IAB nodes 111. The IAB donor may include a CU 106 and a DU 105. IAB nodes 111 may include a DU 105 and a mobile termination (MT). The DU 105 of an IAB node 111 may operate as a parent node, and the MT may operate as a child node.

The base stations 102 or 180 may wirelessly communicate with the UEs 104. Each of the base stations 102 or 180 may provide communication coverage for a respective geographic coverage area 110. There may be overlapping geographic coverage areas 110. For example, the small cell 102' may have a coverage area 110' that overlaps the coverage area 110 of one or more macro base stations, e.g., 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y megahertz (MHz) (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 gigahertz (GHz) unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations frequency range 1 (FR1) (410 MHz-7.125 GHz) and frequency range 2 (FR2) (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation frequency range 3 (FR3) (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations frequency range 2-2 (FR2-2) (52.6 GHz-71 GHz), frequency range 4 (FR4) (71 GHz-114.25 GHz), and frequency range 5 (FR5) (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR2-2, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, a UE 104 may be a Customer Premises Equipment (CPE), such as an Outdoor Device Unit (ODU) 113 that provides a connection between a WAN and a router, such as an Indoor Device Unit (IDU) 103. In some aspects, the ODU 113 may include an IPv6 address component 199 configured to receive, over a first connection with a wireless network, an IPv6 address including a network assigned prefix for the CPE. The IPv6 address component 199 may create or generate a prefix based on a subset of bits from the network assigned prefix. Once the prefix is created, the IPv6 address component may transmit, over a second connection with a local area network (LAN) device, the created prefix created by the IPv6 address component as a wide area network (WAN) prefix for the LAN router device and the network-assigned prefix as a LAN prefix for the LAN router device. Although the following description may be focused on 5G NR, the concepts described herein may be applicable to other similar areas, such as LTE, LTE advanced (LTE-A), CDMA, global system for mobile communications (GSM), and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |

| μ | SCS<br>Δf = $2^μ · 15$[kHz] | Cyclic prefix |
|---|---|---|
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^μ$ slots/subframe. The subcarrier spacing may be equal to $2^μ*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
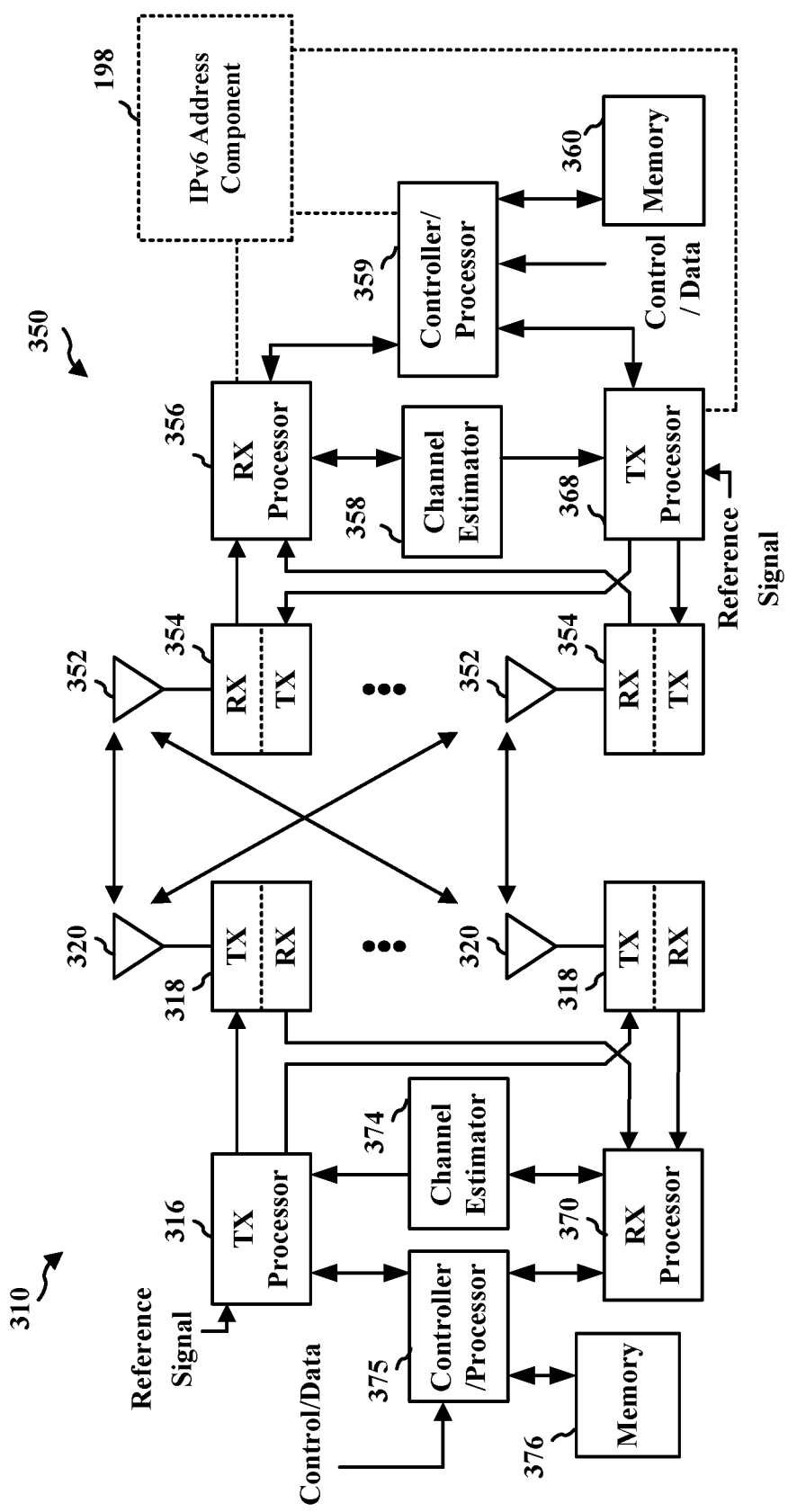
FIG. 3 is a diagram illustrating an example of a base station and user equipment (UE) in an access network, in accordance with various aspects of the present disclosure.

FIG. 3 is a block diagram of a base station 310 in communication with a UE 350 in an access network. In some aspects, the UE 350 may be an ODU, e.g., ODU 113, in FIG. 1. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each sub-carrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through automatic repeat request (ARQ), concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the IPv6 address component 198 of FIG. 1.

Figure 4:
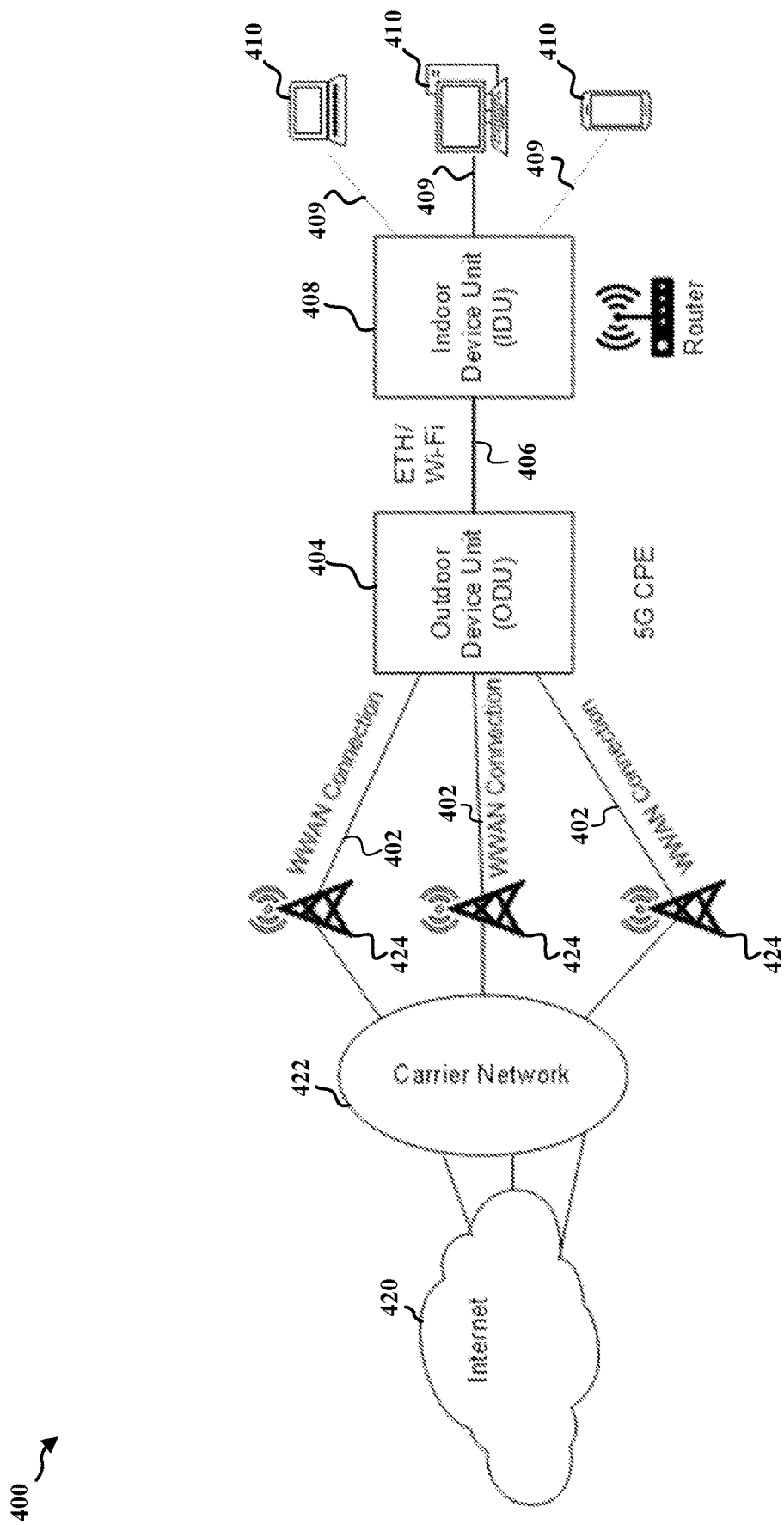
FIG. 4 is a diagram illustrating an example of a wireless communications system and an access network comprising an outdoor device unit (ODU) and an indoor device unit (IDU), in accordance with various aspects of the present disclosure.

FIG. 4 is a diagram 400 illustrating an example of an ODU 404 that may provide a network connection to an IDU 408. In some aspects, a customer premises equipment (CPE), such as a 5G CPE and/or millimeter wave (mm-Wave) CPE, may include an outdoor unit (ODU 404) attached to a home router indoor unit (IDU 408) through a connection that supports an Internet layer protocol, such as an Ethernet and/or Wi-Fi connection 406.

The ODU 404 may be connected to the carrier network 422 by establishing one or more WWAN connections 402 via base stations 424. The carrier network 422 may provide a connection to another network, such as the Internet 420, thereby allowing the ODU 404 to send and receive Internet packets via one or more WWAN connections 402. The ODU 404 may reside outside a building, such as on the roof of a house, while the IDU 408 may sit inside such a building. The ODU 404 may also be located within a building, or the ODU 404 and the IDU 408 may be coupled together to be located within a single unit within or outside a building. An ODU 404 located within a building may be able to communicate with a base station 424. In some aspects, the ODU may communicate with the base station using non mm-wave communication, such as sub-6 communication. The ODU 404 may communicate with the IDU 408 through a wired connection or a wireless connection, e.g., via an Ethernet wire (e.g., 406) and/or through a Wi-Fi connection (e.g., 406). Wi-Fi and Ethernet are merely two examples, and the connection may be based on other radio access technologies (RATs). The connection between the ODU 404 and the IDU 408 may support transmitting packets using an IPv6 protocol. LAN clients 410, may be connected to the IDU 408 via similar mechanism, such as through an Ethernet wire (e.g., 409) (solid line) or through a Wi-Fi connection (e.g., 409) (dotted line). Among others, examples of LAN clients include a desktop, a laptop, a tablet, a personal digital assistant (PDA), a multimedia device, a smart device, a video device, a digital audio player (e.g., MP3 player), a camera, a game console, a wearable device, a vehicle, an electric meter, a gas pump, a large or small kitchen appliance, a healthcare device, an implant, a sensor/actuator, a display, or any other similar functioning device configured to communicate with a router using a network protocol, such as IP.

The ODU 404 may comprise a CPE, which may be a 5G CPE in some aspects, that is configured to provide IPv6 support for off-the-shelf routers, such as an IDU 408 connected to the ODU 404. To provide IPv6 connectivity, an off-the-shelf home router, such as the IDU 408, may be configured to expect to receive two prefixes from the ODU 404—one for its WAN interface and another to delegate to its LAN clients. In the ODU-IDU configuration shown in FIG. 4, where the ODU 404 is connected to the carrier network 422, such as a cellular network, the carrier network 422 may provide a single prefix to ODU 404 via the WWAN connection 402. However, providing a single prefix to the ODU 404 via the WWAN connection 402 may reduce the IPv6 functionality for an off-the-shelf home router IDU, such as the IDU 408, when such an IDU is connected to the ODU 404 without adapting the ODU 404 to provide two prefixes to the IDU 408.

Aspects presented herein enable the ODU 404 to provide prefix sharing using a single prefix provided by the WWAN, when prefix delegation is not supported by the network infrastructure of a WWAN connection 402, in order to provide IPv6 connectivity to the IDU 408's LAN clients 410. If the ODU 404 is not configured to handle prefix delegation or prefix sharing, the LAN clients 410 of the IDU 408 may not receive any IPv6 addresses.

Figure 5:
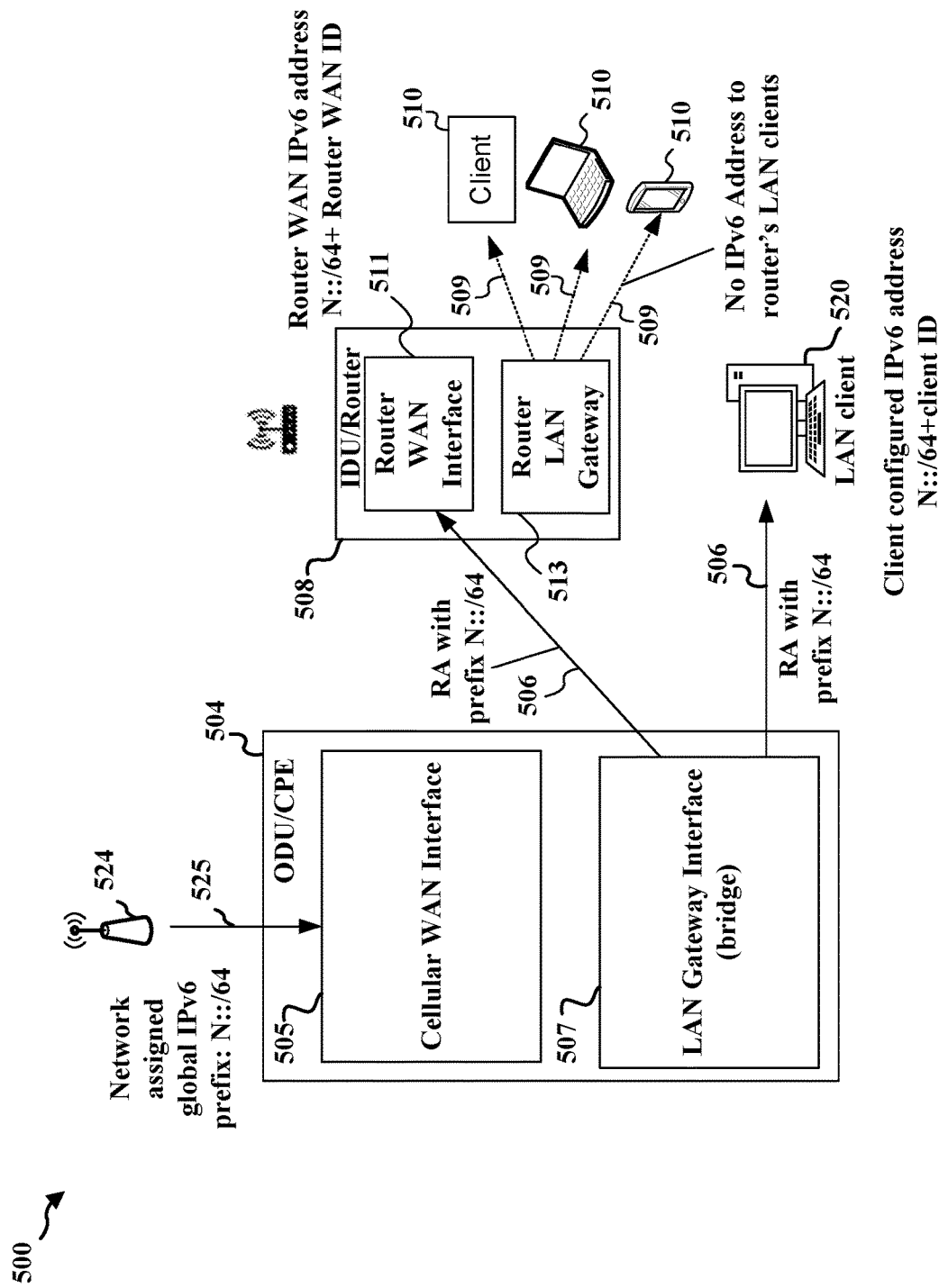
FIG. 5 is a diagram illustrating an example of an access network comprising a CPE/ODU and a router/IDU that is not configured to handle prefix sharing, in accordance with various aspects of the present disclosure.

FIG. 5 is a diagram 500 illustrating an example of a CPE/ODU 504 that may not be configured to handle prefix sharing when communicating with an IDU/router 508 configured to communicate using an IPv6 protocol. The IDU 508 may connect with the ODU 504 in any suitable manner. For example, an off-the-shelf router may support multiple options for configuring a WAN interface, such as the router WAN interface 511, for an IPv6 internet connection, such as dynamic host configuration protocol (DHCP) or auto configuration. While CPE 504 may be described as an ODU 504, the CPE 504 may be indoors, or may be any UE configured to communicate with a base station, such as the base station 524, and with a router, such as the IDU 508.

For IPv6 connectivity, the IDU 508 may be configured to select at least two options from a DHCPv6 server: Identity association for non-temporary address (IANA) and identity association for prefix delegation (IAPD). A DHCP request with an IANA option selected may be referred to as an IANA request, and a DHCP request with an IAPD option selected may be referred to as an IAPD request.

The IDU 508 may be configured to request an IANA address, which may comprise a 128-bit IPv6 address for the router WAN interface 511. The IDU 508 may request an IANA address when a user sets a configuration of the IDU 508 to DHCP. When a user sets a configuration of the IDU 508 to auto configuration, the IDU 508 may configure an address for the router WAN interface 511 using a prefix received from a router advertisement (RA) transmitted from the ODU 504. The IDU 508 may transmit a router solicitation (RS) message to the ODU 504 to request a prefix via an RA, and the ODU 504 may be configured to transmit a unicast RA to the IDU 508 in response. The ODU 504 may be configured to periodically broadcast RA to connected devices via links 506, which may then be received by the router WAN interface 511. The IDU 508 may use the RA prefix to configure its WAN, for example by using a stateless address auto configuration (SLAAC) procedure.

The IDU 508 may be configured to request an IAPD IPv6 prefix from the ODU 504. The IDU 508 may be configured to request the IAPD prefix from the ODU 504 in either DHCP or auto configuration. However, the ODU 504 may be unable to delegate a separate prefix to the router LAN gateway 513 of the IDU 508 as the ODU 504 has a single prefix, which may have been already delegated to the router WAN interface 511 of IDU 508.

When the ODU 504 connects with a base station 524, such as a cellular network base station, the base station 524 may assign a network-assigned global IPv6 prefix of 64-bits to the ODU 504, and transmit it via a communication link 525, such as a WWAN connection. When the IPv6 backhaul is brought up, the CPE ODU 504 may receive the single 64-bit prefix from the network via the base station 524. The cellular WAN interface 505 on ODU 504 may then configure an IPv6 address for the cellular WAN interface 505 using that prefix, for example through SLAAC. The LAN gateway interface 507 may be configured to transmit an RA of the same 64-bit prefix to any connected devices, for example to router WAN interface 511, or LAN client 520 via communication links 506.

When a home router, such as IDU 508, is connected to the ODU 504, the ODU 504 may transmit the same 64-bit network-assigned prefix via the communication link 506. The IDU 508 may then configure an IPv6 address on the router WAN interface 511 via the RA having the same 64-bit network-assigned prefix. In other words, the router WAN interface 511 of IDU 508 may receive an RA via the communication link 506, where the RA has the same 64-bit IPv6 prefix that the cellular WAN interface 505 received from the base station 524 via the communication link 525.

The IDU 508 may also transmit an IANA and an IAPD request to the ODU 504. Such requests may originate from the router WAN interface 511. The ODU 504 may reply from its DHCPv6 server, and the IDU 508 may configure its IPv6 address on the router WAN interface 511 using the IANA response, and may use the IAPD response to assign addresses to the LAN clients 510 of the IDU 508 via the links 509. In other words, the LAN clients 510 may transmit an RS to the router LAN gateway 513, and the router LAN gateway 513 may respond with an RA using the prefix of the IAPD response. As the ODU 504 may have a single prefix, which may be a complete 64-bit prefix, e.g., that cannot be further divided into subnets, there may not be an additional prefix to be provided in an IAPD response, which could be delegated to the router LAN clients 510. Such a situation may exist when the cellular network (not shown) that the base station 524 is connected to does not support prefix delegation. This may reduce or break the IPv6 functionality.

The ODU 504 may not respond to an IAPD request from the IDU 508, as the ODU 504 does not have an additional prefix to delegate. Alternatively, the ODU 504 may respond to an IAPD request using the same network-assigned global IPv6 prefix that is transmitted in an RA message (i.e. a broadcast or a unicast response), or that is used to respond to an IANA request, which may result in a routing issue, as IPv6 uses prefix-based routing, and the LAN clients 510 and the router WAN interface 511 may have the same prefix.

Although prefix delegation may not be supported by a cellular network connected to the base station 524, aspects presented herein may provide for prefix delegation on a CPE/ODU to share the same network prefix with an IDU router's LAN to enable smooth end-to-end IPv6 functionality. Such a configuration may allow for full IPv6 functionality to be enabled for off-the-shelf routers when connected in ODU-IDU configuration to a CPE. Such a configuration may be relevant to other systems as well.

Figure 6:
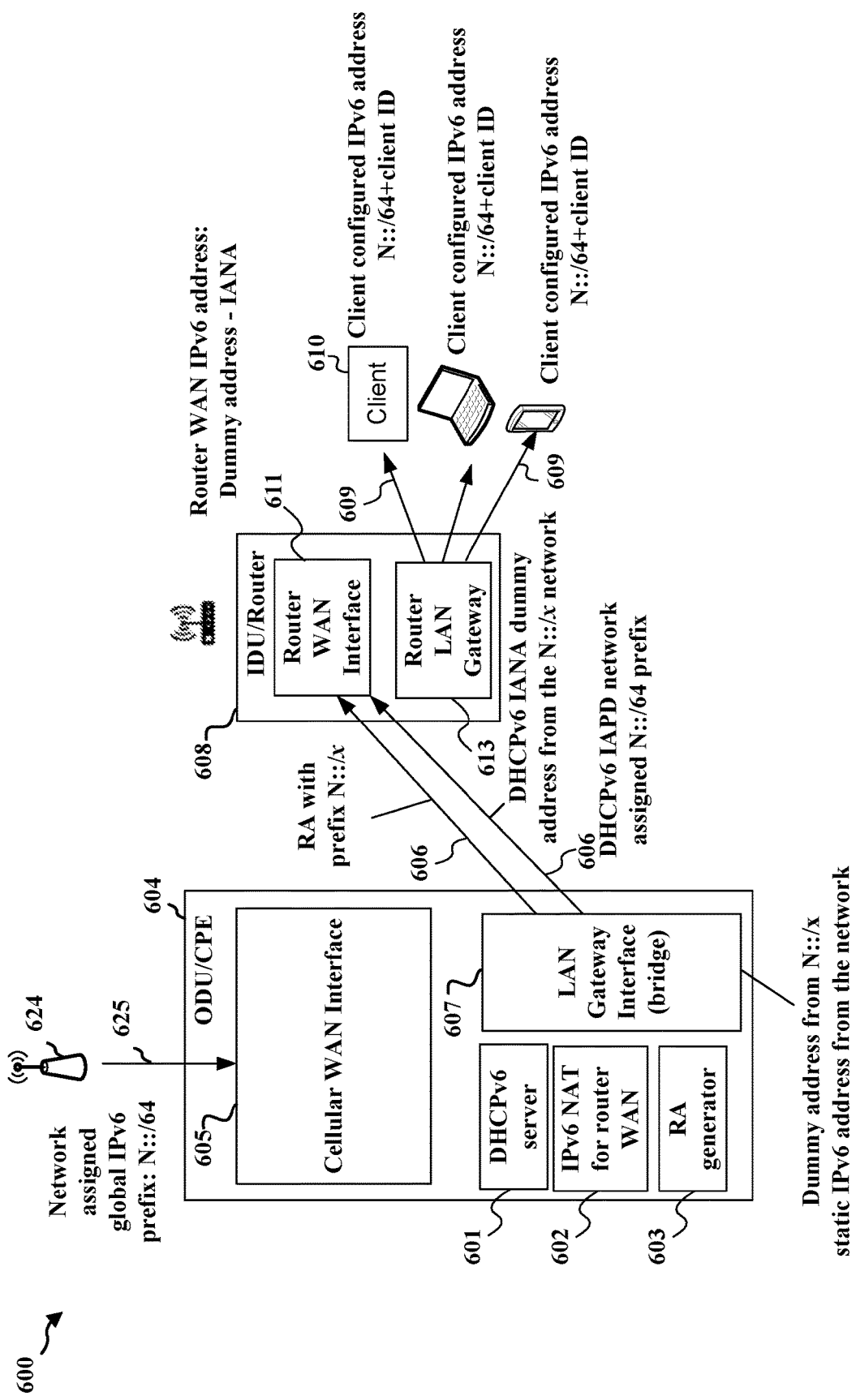
FIG. 6 is a diagram illustrating an example of an access network comprising a CPE/ODU and a router/IDU that is configured to handle prefix sharing by generating a dummy network prefix, in accordance with various aspects of the present disclosure.

FIG. 6 has a diagram 600 illustrating an example of a CPE/ODU 604 that may be configured to handle prefix sharing by generating a dummy network when communicating with an off-the-shelf router/IDU 608 configured to communicate using an IPv6 protocol. Prefix delegation may not be supported by the network infrastructure of the communication link 625. The ODU 604 may be configured to handle prefix delegation using a network-assigned prefix provided by the WWAN base station 624 via the communication link 625. Such a configuration may also provide IPv6 connectivity to the IDU router 608's LAN clients 610. While the CPE 604 may be described as an ODU 604, the CPE 604 may be indoors, or may be any UE configured to communicate with a base station, such as the base station 624, and configured to communicate with a router, such as the IDU 608. Although the term "dummy network" is used herein, the prefix may be instead referred to as an ODU generated prefix, a temporary ODU generated prefix, etc.

As the ODU 604 connects with the base station 624 (e.g. a 5G or a mmWave cellular network base station), the base station 624 may assign a network-assigned global IPv6 prefix of 64-bits to the ODU 604 via a communication link 625, such as a WWAN connection. In other words, when the IPv6 backhaul is brought up, the ODU 604 may receive the single 64-bit prefix from the network via the base station 624 via the communication link 625. The cellular WAN interface 605 on ODU 604 may then configure an IPv6 address for the cellular WAN interface 605 using that network-assigned prefix using any suitable means, for example through SLAAC.

The ODU 604 may make use of the 64-bit network-assigned prefix provided by the base station 624 to generate a dummy network using the first x bits of the 64-bit network-assigned prefix. x may be any number between 1-63, and dictates the number of 64-bit prefixes that may be generated by the ODU 604. For example, where x=62, the ODU 604 may generate a ::/62 dummy network using the first 62 bits of the 64-bit network-assigned prefix, allowing for the ODU 604 to generate four 64-bit prefixes, one of which is the network-assigned prefix provided by the base station 624 and three of which that may be dummy networks different from the network-assigned prefix. Where x=6, the ODU 604 may generate a ::/58 dummy network using the first 58 bits of the 64-bit network-assigned prefix, allowing for the ODU 604 to generate sixty-four 64-bit prefixes, one of which is the network-assigned prefix provided by the base station 624 and sixty-three of which that may be dummy networks different from the network-assigned prefix. Either of the LAN gateway interface 607 of the ODU 604 or the router WAN interface 611 may be designated a prefix from the ::/x dummy network. As 64-x bits of the ::/x dummy network remain unassigned, 2^x different 64-bit prefixes may be designated as a part of a ::/x dummy network. The ODU 604 may be configured to not assign the 64-bit network-assigned prefix as one of the generated 64-bit addresses of the ::/x dummy network. The ODU 604 may be configured to assign the 64-bit network-assigned prefix in an IAPD response to a router, which may allow the IDU 608 to configure the LAN clients 610 using the network-assigned prefix. Each of the LAN gateway interface 607 of the ODU 604 and the router WAN interface 611 of the IDU 608 may also receive a 128-bit complete address using a prefix from the ::/x dummy network. The ODU 604 may be configured to assign a static IPv6 address to the LAN gateway interface 607 using a prefix from the ::/x dummy network. Doing so allows the ODU 604 to run the DHCPv6 601 server on the LAN gateway interface 607, providing an IPv6 address with which the DHCPv6 601 server may bind to the interface.

The ODU 604 may also have a DHCPv6 server 601 configured to assign IPv6 addresses to a WAN interface of an IDU, such as the router WAN interface 611 of the IDU 608. The DHCPv6 server 601 may also be configured to ensure that the prefix assigned to a router WAN interface (e.g. via an RA or an IANA request) is different than a prefix assigned to router LAN clients (e.g. via an IAPD request). In this case, the DHCPv6 server 601 may provide an RA with a prefix N::/x via link 606 to the router WAN interface 611 and may provide an IAPD network-assigned N::/64 prefix via link 606 to the IDU 608 to use for the LAN clients 610. Doing so may prevent downlink traffic failure for the router LAN gateway 613 because of the prefix-based routing. As the router WAN interface 611 is assigned an IPv6 address from the ::/x network, the IPv6 NAT 602 may be configured to provide SNAT/DNAT services. For uplink traffic from the router WAN interface 611, the IPv6 NAT 602 may be configured to change a source address (SNAT) to an address for the cellular WAN interface 605. For downlink traffic to the router WAN interface 611, the IPv6 NAT 602 may change a destination address (DNAT) to an address of router WAN interface. In some aspects, for uplink or downlink traffic from the LAN clients 610, the IPv6 NAT 602 may not be performed, as the LAN clients 610 may be assigned IPv6 addresses using the network-assigned global N::/64 prefix received from the base station 624 via link 625.

As an example, a data call may be brought up to connect the ODU 604 to the base station 624. The base station 624 may transmit a 64-bit prefix of 2002:c023:9c17:1f2d::/64 to the ODU 604 via the communication link 625, which may be a WWAN communication link. The ODU 604 may then use the first 54 bits of this prefix to generate a ::/54 dummy network (i.e. 2002:c023:9c17:1c00::/54. As the prefixes do not belong to any device yet, the prefixes may be used for the IDU router WAN interface 611 and the ODU LAN gateway interface 607. In other words, the ODU 604 may assign a static IPv6 address from the ::/54 dummy network to the LAN gateway interface 607. The RA generator 603 may broadcast the prefix for the ::/54 dummy network as an RA signal along any of links 606. The WAN-facing traffic using a dummy network prefixes may then be forced to go over IPv6 NAT. The IPv6 NAT 602 may be configured to perform IPv6 SNAT/DNAT for traffic using a dummy network prefix.

In this example, when a network, such as a cellular network, assigns a 64-bit prefix to the cellular WAN interface 605 of the ODU 604 via the base station 624, the ODU 604 may configure its 128-bit global IPv6 address using SLAAC to 2002:c023:9c17:1f2d:95e:1e88:d351:a9c0/128 using the 64-bit prefix 2002:c023:9c17:1f2d::/64. The ODU 604 may then assign a static 128-bit address to the LAN gateway interface 607, such as 2002:c023:9c17:1c00::1000/128, using the ::/54 bit dummy network 2002:c023:9c17:1c00:154. The ODU 604 may then bind the DHCPv6 server 601 to this IPv6 address of 2002:c023:9c17:1c00::1000/128. Through the DHCPv6 server 601, the router WAN interface 611 may then be assigned an address from the ::/54 dummy network, such as 2002:c023:9c17:1c00::1f00/128 using the ::/54 dummy network 2002:c023:9c17:1c00::/54. As the IDU 608 may transmit a request for an IAPD prefix to the ODU 604, the DHCPv6 server 601 may respond by assigning the 64-bit network-assigned prefix of 2002:c023:9c17:1f2d::/64. The DHCPv6 server may also generate a pool of IPv6 addresses based on the ::/54 dummy network 2002:c023:9c17:1c00154 to be used for IANA requests from the IDU 608. In either case, LAN clients 610 connected to the router LAN gateway 613 via communication links 609 may then configure their own addresses in any suitable manner, for example by using SLAAC.

The router WAN interface 611 may communicate using a dummy network prefix, with traffic being translated by the IPv6 NAT 602, while the LAN clients 610 may communicate using the network-assigned prefix without traffic being translated using the IPv6 NAT 602.

The ODU 604 may be configured to use a dummy network prefix to respond to an IAPD request from the IDU 608. With such an example, the IPv6 NAT 602 may translate traffic from the LAN clients 610, as the LAN clients 610 may be assigned IPv6 addresses using the dummy network prefix. Such an example may be applied where several routers are connected to the ODU 604, and using a different dummy prefix for each router's IAPD request may prevent LAN clients from different routers from being assigned a same IPv6 address.

As another example, the ODU/CPE 604 may receive a network-assigned global address from the base station 624 via the communication link 625. The ODU 604 may receive a 64-bit prefix of 2002:c023:9c17:1f2d::/64 when a data call is brought up between the ODU 604 and the base station 624. The ODU may then create a dummy network based from the 64-bit prefix by matching the first few bits of this prefix. For example, a 52-bit network may be created by matching the first 52 bits (2002:c023:9c17:1000::/52) of the 64-bit prefix, or a 56-bit network may be created by matching first 56 bits (2002:c023:9c17:1f00::/56) of the 64-bit prefix. In fact, an even smaller subnet may be created by matching the first 63 bits (2002:c023:9c17:1f2c::/63) of the 64-bit prefix. In such a 63-bit network, two networks may exist in that subnet—the dummy network of 2002:c023:9c17:1f2c::/64 and the network-assigned prefix of 2002:c023:9c17:1f2d::/64 received from the base station 624 via the communication link 625.

The DHCPv6 server 601 may use the 63-bit dummy network subnet for configuration. The ODU 604 may also assign IPv6 addresses using the dummy prefix to other devices, for example the LAN gateway interface 607, and the router WAN interface 611. For example, 2002:c023:9c17:1f2c:164, 2002:c023:9c17:1f2c::1/128 (statically), 2002:c023:9c17:1f2c::10/128 (through IANA), and 2002:c023:9c17:1f2d::/64 (through IAPD). In other words, the LAN gateway interface 607 may be assigned a static address of 2002:c023:9c17:1f2c::1/128, and may transmit an RA of 2002:c023:9c17:1f2c::/63. When an IANA request is sent to the ODU 604, the DHCPv6 server 601 may return 2002:c023:9c17:1f2c::10/128, and when an IAPD request is sent to the ODU 604, the DHCPv6 server 601 may return 2002:c023:9c17:1f2d::/64.

In such a configuration with a small 63-bit dummy network subnet, the router LAN clients 610 may be able to configure their own addresses using the network-assigned prefix 2002:c023:9c17:1f2d::/64. The IPv6 NAT 602 may add IPv6 NAT rules for router WAN IPv6 addresses, while RA's may be sent with the dummy prefix 2002:c023:9c17:1f2c::/63.

Figure 7:
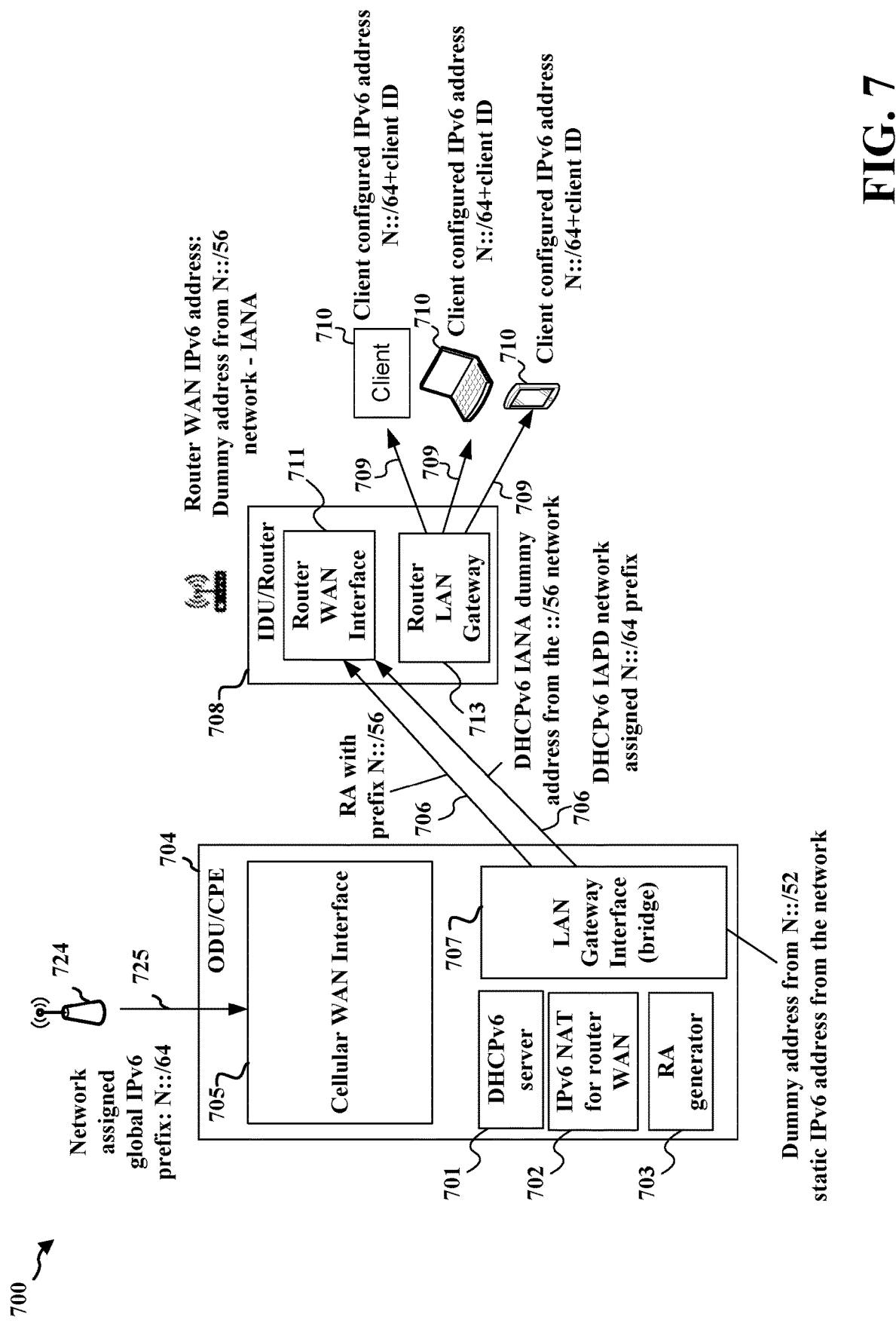
FIG. 7 is a diagram illustrating an example of an access network comprising a CPE/ODU and a router/IDU that is configured to handle prefix sharing by generating two dummy network prefixes, in accordance with various aspects of the present disclosure.

FIG. 7 has a diagram 700 illustrating an example of a CPE/ODU 704 that may be configured to handle prefix sharing by generating two or more dummy networks when communicating with an IDU/router 708 configured to communicate using an IPv6 protocol. Prefix delegation may not be supported by the network infrastructure of the communication link 725. The ODU 704 may be configured to handle prefix sharing using a single network-assigned prefix provided by the WWAN base station 724 via the communication link 725. Such a configuration may provide IPv6 connectivity to the IDU router's (e.g., 708) LAN clients 710. While CPE (e.g., 704) may be described as an ODU 704, the CPE may be indoors, or may be any UE configured to communicate with a base station, such as the base station 724, and with a router, such as the IDU 708.

Similar to the ODU 604 of FIG. 6, as the ODU 704 may be configured to connect with a base station 724, such as a cellular network base station. The base station 724 may assign a network-assigned global IPv6 prefix of 64-bits to the ODU 704 via a communication link 725, such as a WWAN connection. When the IPv6 backhaul is brought up, the CPE ODU 704 may receive the single 64-bit prefix from the network via the base station 724 via the communication link 725. The cellular WAN interface 705 on ODU 704 may then configure an IPv6 address for the cellular WAN interface 705 using that prefix using any suitable means, for example through SLAAC.

The ODU 704 may make use of the 64-bit network-assigned prefix provided by the base station 724 to generate one or more dummy networks of any number of bits. In the example illustrated in diagram 700, two dummy networks are shown as being created by the ODU 704 having 52-bits and 56-bits, respectively. However, the ODU 704 may be configured to generate one dummy network, or more than two dummy networks, and still preserve IPv6 functionality. Likewise, the ODU 704 may be configured to generate dummy networks of any size between 1 and 63-bits, such as 12-bits, 20-bits, and 32-bits.

As shown in diagram 700, the ODU 704 may generate a ::/52 dummy network using the first 52 bits of the 64-bit network-assigned prefix and a ::/56 dummy network using the first 56 bits of the 64-bit network-assigned prefix. The LAN gateway interface 707 of the ODU 704 may be designated as a part of the ::/52 dummy network and the router WAN interface 711 of the IDU 708 may be designated as a part of the ::/56 dummy network. As 16 bits of the ::/52 dummy network remain unassigned, $2^{16}-1$ different 64-bit prefixes may be designated as a part of the ::/52 dummy network. The ODU 704 may be configured to not assign the 64-bit network-assigned prefix as one of the prefixes of the ::/52 dummy network. As 12 bits of the ::/56 dummy network remain unassigned, $2^{12}-2$ different 64-bit prefixes may be designated as a part of the ::/56 dummy network. The ODU 704 may be configured to not assign the 64-bit network-assigned prefixes as one of the prefixes for the ::/56 dummy network and may be configured not to assign the 64-bit prefix chosen for the LAN gateway interface 707 as one of the prefixes for the ::/52 dummy network. The LAN gateway interface 707 of the ODU 704 may also receive a 128-bit complete address from the ::/52 dummy network.

The ODU 704 may have a DHCPv6 server 701 configured to assign IPv6 addresses to a WAN interface of an IDU, such as the router WAN interface 711 of the IDU 708. The DHCPv6 server 701 may be configured to ensure that IPv6 addresses assigned to the router WAN interface 711 by the DHCPv6 server 701 are on a part of the same network as the prefix for delegation and the IPv6 address of the interface on which server is running (e.g. the ODU LAN gateway interface 707). The router LAN clients 710 may use the same prefix as the network-assigned prefix to prevent the network from dropping traffic originating from another prefix. The prefix used for the router WAN interface prefix (e.g., for 711) may be different than the prefix used by the router LAN clients 710 to prevent the prefix-based routing to lead to possible downlink traffic failure for the router LAN of the IDU 708.

The ODU 704 may also be configured to ensure that the 64-bit router WAN interface prefix assigned to the router WAN interface 711 is different than the 64-bit dummy address of the LAN gateway interface 707. As the router WAN interface 711 is assigned an IPv6 address from the ::/56 network, the IPv6 NAT 702 may be configured to provide SNAT/DNAT services. For uplink traffic from the router WAN interface 711, the IPv6 NAT 702 may be configured to change a source address (SNAT) to an address for the cellular WAN interface 705. For downlink traffic to the router WAN interface 711, the IPv6 NAT 702 may change a destination address (DNAT) to an address of router WAN interface. For uplink or downlink traffic from the LAN clients 710, the IPv6 NAT 702 may not be performed, as the LAN clients 710 may be assigned IPv6 addresses using the network-assigned global N::/64 prefix received from the base station 724 via link 725.

As an example, a data call may be brought up to connect the ODU 704 to the base station 724. The base station 724 may transmit a 64-bit prefix of 2002:c023:9c17:1f2d::/64 to the ODU 704 via the communication link 725, which may be a WWAN communication link. The ODU 704 may then use the first 52 bits of this prefix to generate a ::/52 dummy network (i.e. 2002:c023:9c17:1000::/52) and the ODU 704 may use the first 56 bits of this prefix to generate a ::/56 dummy network (i.e. 2002:c023:9c17:1f00::/56). As the prefixes do not belong to any device yet, the prefixes may be used for the IDU router WAN interface 711 and the ODU LAN gateway interface 707. In other words, the ODU 704 may assign a static IPv6 address from the ::/52 dummy network to the LAN gateway interface 707. The RA generator 703 may broadcast a prefix for the ::/56 dummy network to allow connected devices, such as the router WAN interface 711, to assign themselves an address from the ::/56 dummy network. The WAN-facing traffic using these dummy prefixes may then be forced to go over IPv6 NAT. The IPv6 NAT 702 may be configured to perform IPv6 SNAT/DNAT.

In this example, when a network, such as a cellular network, assigns a 64-bit prefix to the cellular WAN interface 705 of the ODU 704 via the base station 724, the ODU 704 may configure its 128-bit global IPv6 address using SLAAC to 2002:c023:9c17:1f2d:95e:1e88:d351:a9c0/128 using the 64-bit prefix 2002:c023:9c17:1f2d::/64. This 128-bit global IPv6 address may be assigned to the cellular WAN interface 705 of the ODU 704. The ODU 704 may then assign a static 128-bit address to the LAN gateway interface 707, such as 2002:c023:9c17:1000::1000/128, using the ::/52 bit dummy network 2002:c023:9c17:1000::/52. The ODU 704 may then bind the DHCPv6 server 701 to this IPv6 address of 2002:c023:9c17:1000::1000/128. Through the DHCPv6 server 701, the router WAN interface 711 may then be assigned an address from the ::/56 dummy network, such as 2002:c023:9c17:1f00::1f00/128 using the ::/56 dummy network 2002:c023:9c17:1f00::/56. As the IDU 708 may transmit a request for an IAPD prefix to the ODU 704, the DHCPv6 server 701 may respond by providing the 64-bit network-assigned prefix of 2002:c023:9c17:1f2d::/64. The DHCPv6 server may also generate a pool of IPv6 addresses based on the ::/56 dummy network 2002:c023:9c17:1f00::/56 to be used for IANA requests from the IDU 708. In either case, LAN clients 710 connected to the router LAN gateway 713 via communication links 709 may then configure their own addresses in any suitable manner, for example by using SLAAC, using the network-assigned global IPv6 prefix of 2002:c023:9c17:1f2d::/64.

As routers, such as IDU 708, may use an RA to determine default gateways and as a way for failure detection, the ODU 704 may be configured to be unable to completely block an RA. The RA generator 703 may be a daemon configured to send RA along any of links 706 with a dummy ::/56 prefix, such as 2002:c023:9c17:1f00/56 in the example above. While the IDU 708 is shown here as providing the network-assigned prefix to the LAN clients 710, the ODU/CPE 704 may be configured to provide an IAPD dummy prefix, such as a 64-bit prefix generated for a dummy ::/60 prefix, to the IDU 708, which may allow the IDU 708 to provide client-configured IPv6 addresses using this other dummy network prefix. Traffic using that dummy network may then be translated by the IPv6 NAT 702. The CPE/ODU 704 may be able to use any network or any unique local address (ULA) in other examples.

Figure 8:
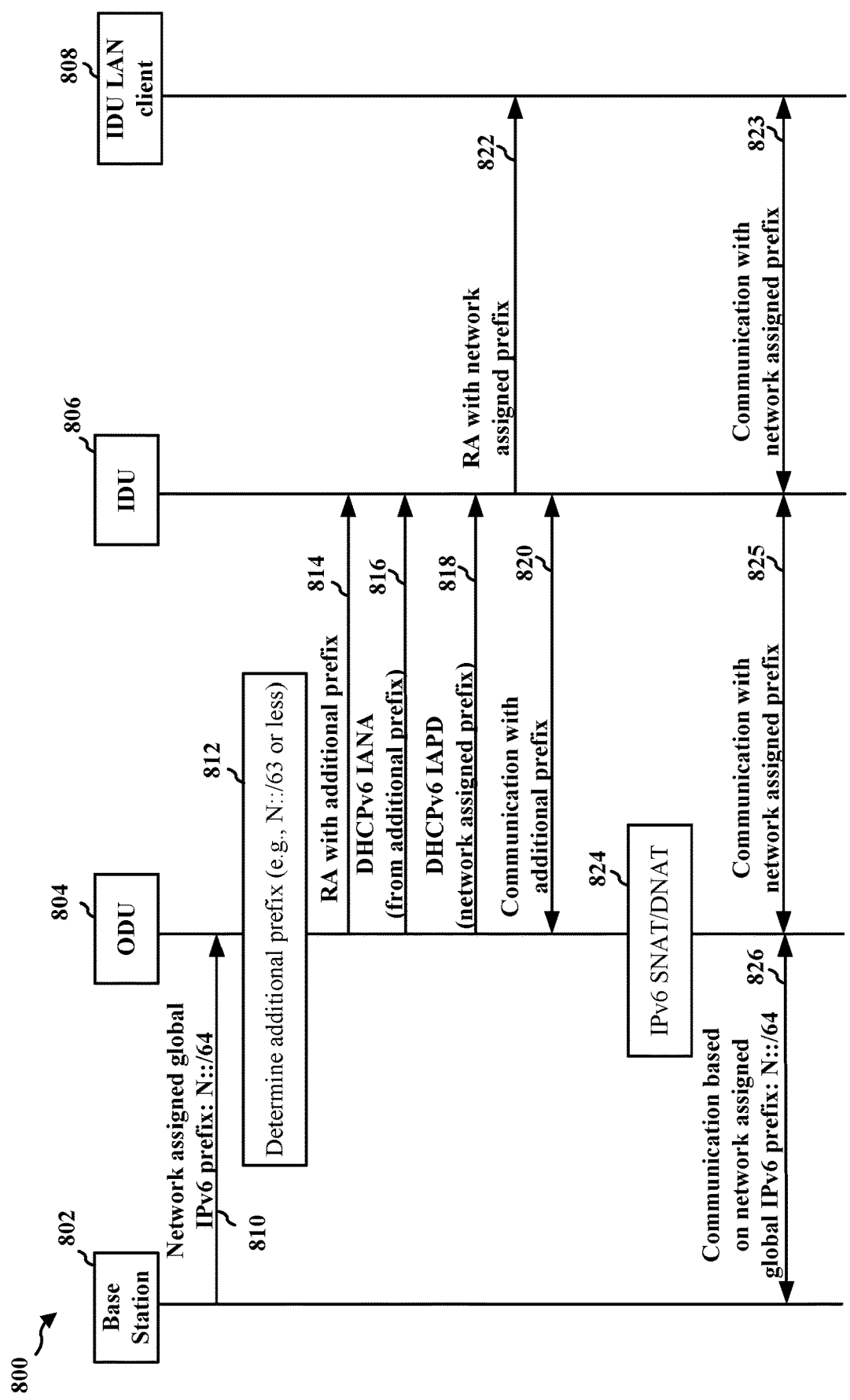
FIG. 8 is a network connection flow diagram that illustrates a CPE/ODU that handles prefix sharing by generating a dummy network prefix to communicate with a router/IDU.

FIG. 8 illustrates a network connection flow diagram 800 illustrating an ODU 804 that handles prefix sharing from a prefix transmitted 810 from the base station 802 to the ODU 804. The base station 802 may be connected to any suitable network, such as an intranet or the Internet. As the base station 802 and the ODU 804 establish a connection with one another, the base station 802 may transmit a network-assigned global IPv6 prefix of 64-bits to the ODU 804 in message 810. The ODU 804 may use the network-assigned global IPv6 prefix to configure its 128-bit global IPv6 address, for example by using SLAAC, which may be assigned to its own WAN interface. The ODU 804 may generate a dummy network to use when communicating with an IDU 806 based on the prefix transmission message 810. The ODU 804 may parse the IPv6 prefix of 64-bits into a sub-prefix of any suitable bit length between 1 and 63. For example, the ODU 804 may determine 812 an additional prefix of 48-bits to generate a ::/48 dummy network. The ODU 804 may be configured to use the additional prefix to assign IPv6 addresses to, for example, a LAN gateway interface of the ODU 804 or a WAN interface of the IDU 806.

The ODU 804 may be configured to transmit an RA 814 based on the additional prefix. The message of the RA 814 may be transmitted periodically to all connected devices or in response to an RS from the IDU 806. The IDU 806 may configure its own WAN address using the prefix from the RA 814. The ODU 804 may also be configured to transmit an IANA address in message 816 to the IDU 806, where the IANA address is generated based on the additional prefix. The ODU 804 may also be configured to transmit an IAPD prefix in message 818 to the IDU 806. The IAPD prefix may be the network-assigned prefix. The IANA address and/or the IAPD address may be transmitted by a DHCPv6 server on the ODU 804.

As the IDU 806 transmits messages 820 using the additional prefix with the ODU 804, IPv6 addresses based on the additional prefix may be used to identify source and destination addresses of devices using the additional prefix, such as the router WAN interface. In this manner, the ODU 804 may readily identify source and target devices using the additional prefix using the additional prefix. The ODU 804 may also translate messages 820 using the additional prefix between the ODU 804 and/or the IDU 806 and messages 826 using the network assigned global IPv6 prefix between the ODU 804 and the base station 802 using IPv6 SNAT and DNAT 824.

The IDU router LAN gateway of the IDU 806 may transmit an RA 822 with the network-assigned prefix to an IDU LAN client 808. The IDU LAN client 808 may then configure an IPv6 address using the network-assigned prefix, and communicate using that IPv6 address using the network-assigned prefix via messages 823. As the IDU 806 transmits messages 825 using the network-assigned prefix with the ODU 804, IPv6 addresses based on the network-assigned prefix may be used to identify source and destination addresses, such as the IDU LAN client 808. Such messages may be passed directly through the IDU 806 to the ODU 804, and may not be translated using the IPv6 SNAT/DNAT 824. As such, IPv6 SNAT/DNAT 824 may not be performed for devices that use the network-assigned prefix, such as the IDU LAN client 808.

Figure 9:
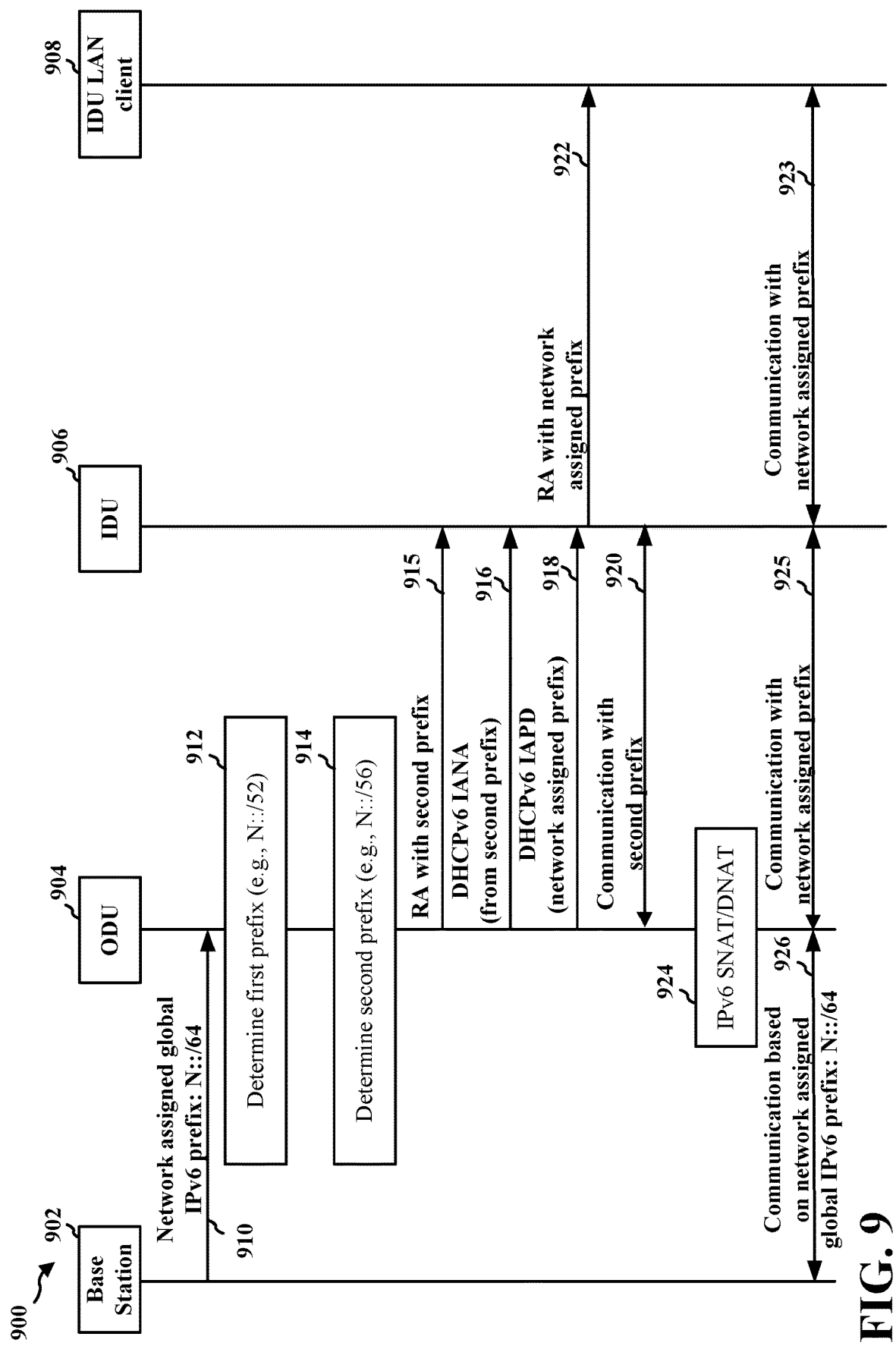
FIG. 9 is a network connection flow diagram that illustrates a CPE/ODU that handles prefix sharing by generating two dummy network prefixes to communicate with a router/IDU.

FIG. 9 illustrates a network connection flow diagram 900 illustrating an ODU 904 that handles prefix sharing from a prefix transmitted 910 from the base station 902 to the ODU 904. The base station 902 may be connected to any suitable network, such as an intranet or the Internet. As the base station 902 and the ODU 904 establish a connection with one another, the base station 902 may transmit a network-assigned global IPv6 prefix of 64-bits to the ODU 904 in message 910. The ODU 904 may use the network-assigned global IPv6 prefix to configure its 128-bit global IPv6 address, for example by using SLAAC, which may be assigned to its own WAN interface. The ODU 904 may generate two or more dummy networks to use when communicating with an IDU 906 based on the prefix transmission message 910. The ODU 904 may parse the IPv6 prefix of 64-bits into two sub-prefixes of different bit lengths. For example, the ODU 904 may determine 912 a first prefix of 52-bits to generate a ::/52 dummy network and may determine 914 a second prefix of 56-bits to generate a ::/56 dummy network. The ODU 904 may be configured to use the first prefix to assign IPv6 addresses to, for example, a LAN gateway interface of the ODU 904 or a WAN interface of the IDU 906. The ODU 904 may be configured to use the second prefix to assign IPv6 addresses to, for example, a router WAN interface.

The ODU 904 may be configured to transmit an RA 915 based on the second prefix. The message of the RA 915 may be broadcast periodically to all connected devices or in response to an RS from the IDU 906, or may be unicast in response to an RS request. The IDU 906 may configure its own WAN address using the prefix from the RA 915. The ODU 904 may also be configured to transmit an IANA address in message 916 to the IDU 906, where the IANA address is generated based on the second prefix. The ODU 904 may also be configured to transmit an IAPD prefix in message 918 to the IDU 906, where the IAPD prefix may also be generated based on the network-assigned prefix. The IANA address and/or the IAPD prefix may be transmitted by a DHCPv6 server on the ODU 904.

As the IDU 906 transmits messages 920 using the second prefix with the ODU 904, IPv6 addresses based on the second prefix may be used to identify source and destination addresses using the second prefix, such as the router WAN interface. In this manner, the ODU 904 may readily identify source and target devices connected to the IDU 906 using the second prefix and may readily identify its own devices, such as a DHCPv6 server, using the first prefix. The ODU 904 may also translate messages 920 between the ODU 904 and the IDU 906 and/or messages 926 between the ODU 804 and the base station 902 using IPv6 SNAT and DNAT 924 based on the second prefix.

The IDU router LAN gateway of the IDU 906 may transmit an RA 922 with the network-assigned prefix to an IDU LAN client 908. The IDU LAN client 908 may then configure an IPv6 address using the network-assigned prefix, and communicate using that IPv6 address using the network-assigned prefix via messages 923. As the IDU 906 transmits messages 925 using the network-assigned prefix with the ODU 904, IPv6 addresses based on the network-assigned prefix may be used to identify source and destination addresses, such as the IDU LAN client 908. Such messages may be passed directly through the IDU 906 to the ODU 904, and may not be translated using the IPv6 SNAT/DNAT 924. As such, IPv6 SNAT/DNAT 924 may not be performed for such LAN clients.

Figure 10:
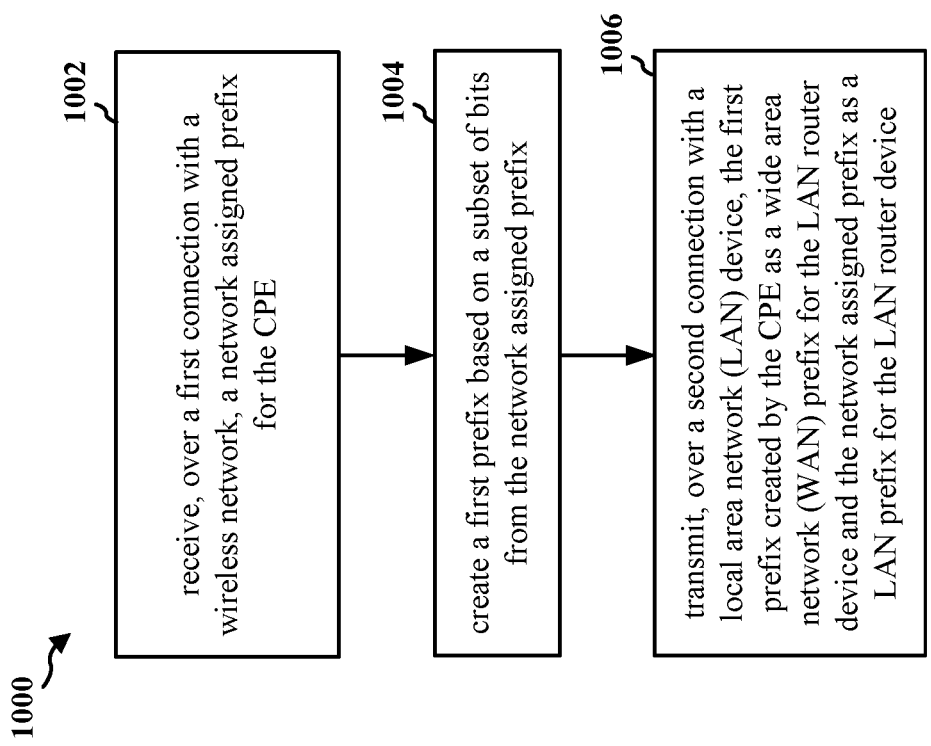
FIG. 10 is a flowchart of a method of wireless communication at a CPE, in accordance with various aspects of the present disclosure.

FIG. 10 is a flowchart 1000 of a method of wireless communication. The method may be performed by a UE, such as an ODU or CPE (e.g., the UE 104, ODU 113, 404, 504, 604, 704, 804, 904; the apparatus 1102). The method may enable a CPE to generate one or more prefixes for use with a local router when the CPE is connected to a network, such as a base station providing a WWAN connection, that is not configured to support delegating multiple prefixes to the CPE.

At 1002, the CPE may receive, over a first connection with a wireless network, a network assigned prefix for the CPE. For example, the CPE 604 in FIG. 6 may receive a 64-bit network-assigned global IPv6 prefix from the base station 624. The CPE 604 may generate a 128-bit address for its cellular WAN interface 605 using the 64-bit network-assigned global IPv6 prefix in any suitable manner, for example via SLAAC.

At 1004, the CPE may create a first prefix based on a subset of bits from the network assigned prefix. For example, 1004 may be performed by the IPv6 address component 1140 to create the first prefix using the first 52 bits of the 64-bit network-assigned global IPv6 prefix (e.g., and not the remaining 8 bits). Or the CPE 604 in FIG. 6 may generate a first prefix of x-bits (where x is less than 64) to create the first prefix using the first x bits (e.g., and not the remaining bits) of the 64-bit network-assigned global IPv6 prefix.

At 1006, the CPE may transmit, over a second connection with a LAN device, the first prefix created by the CPE as a WAN prefix for the LAN router device and the network-assigned prefix as a LAN prefix for the LAN router device. For example, in FIG. 6, the LAN gateway interface 607 may be configured to transmit an x-bit prefix as an RA to the router WAN interface 611, or may be configured to provide an IANA dummy address from the ::/x dummy network.

In some aspects, the LAN router device may be a router IDU, and the CPE may be an ODU that provides a connection between the router IDU and a WWAN. For example, the ODU 604 and the IDU 608 of FIG. 6.

The IPv6 address may include a 128-bit address. The network-assigned prefix may have a 64-bit network assigned prefix for an IPv6 connection. For example, the network-assigned global prefix may be transmitted from the base station 624 to the ODU 604 via the transmission link 625 of FIG. 6.

In some aspects, the first prefix created by the CPE and transmitted to the LAN router device may include a dummy network prefix based on 56 bits from the 64-bit network assigned prefix. The first prefix may be created based on a first subset of bits from the network assigned prefix. With such a first prefix, the CPE may create a second prefix based on a second subset of bits from the network assigned prefix. The CPE may also assign an address to a LAN gateway interface of the CPE based on the second prefix. For example, the CPE (e.g., 704) of FIG. 7 may assign an address to the LAN gateway interface 707 based on the second prefix. Messages transmitted from the LAN clients 710 of the router LAN gateway 713 may not be translated using the IPv6 NAT, as they may use the network-assigned prefix.

In some aspects, the second subset of bits may be less than the first subset of bits. The second subset may also overlap with the first subset of bits of the network assigned prefix. For example, the subset N::/52 of bits for the LAN gateway interface 707 may be less than the subset N::/56 of bits used for an RA transmission to the router WAN interface 711 of FIG. 7.

In some aspects, the first subset of bits may include 56-bits of the 64-bit network assigned prefix. The second subset of bits may include 52-bits of the 64-bit network assigned prefix.

In some aspects, the CPE may receive an IANA request from the LAN router device; and receiving an IAPD request from the LAN router device. To transmit the first prefix and the network assigned prefix to the LAN router device, the CPE may transmit the first prefix in response to the IANA request and transmit the network assigned prefix in response to the IAPD request. In some aspects, to transmit the first prefix and the network assigned prefix to the LAN router device, the CPE may transmit the first prefix in a router advertisement. For example, the RA with the prefix N::/x transmitted from the LAN gateway interface 607 to the router WAN interface 611 of FIG. 6.

In some aspects, the CPE may perform NAT for uplink traffic from the LAN router device to translate between the first prefix and the network assigned prefix. Such NAT may be performed, for example, by the IPv6 NAT 602 shown in FIG. 6.

Figure 11:
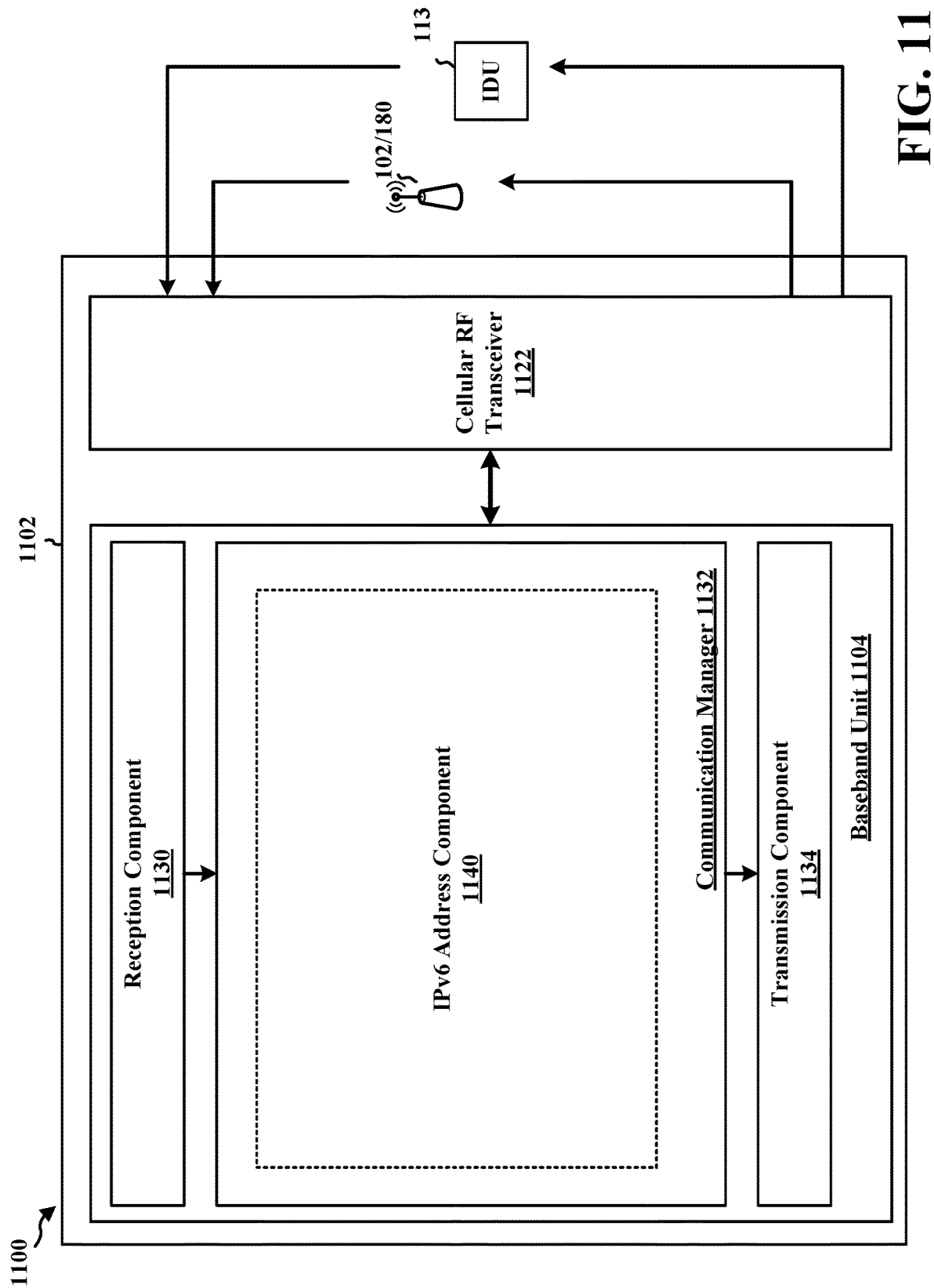
FIG. 11 is a diagram illustrating an example of a hardware implementation for an example apparatus, in accordance with various aspects of the present disclosure.

FIG. 11 is a diagram 1100 illustrating an example of a hardware implementation for an apparatus 1102. The apparatus 1102 may be a UE, a component of a UE, or may implement UE functionality. For example, the apparatus 1102 may be an ODU, a component of an ODU, or may implement ODU functionality. The apparatus 1102 may also or alternatively be a CPE, a component of a CPE, or may implement CPE functionality. In some aspects, the apparatus 1102 may include a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the UE 350 and may include the memory 360 and/or at least one of the TX processor 368, the RX processor 356, and the controller/processor 359.

The communication manager 1132 includes an IPv6 address component 1140 that receives a network-assigned prefix and generates a new prefix based upon the received network-assigned prefix, e.g., as described in connection with 1004 of FIG. 10.

The apparatus may include additional components that perform each of the blocks of the algorithm in the flowcharts of FIG. 10. As such, each block in the flowcharts of FIG. 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the baseband unit 1104, includes means for receiving, over a first connection with a wireless network, an IPv6 address including a network-assigned prefix, creating a first prefix based on a subset of bits from the network-assigned prefix, transmitting, over a second connection with a local area network (LAN) device, the first prefix created by the CPE as a wide area network (WAN) prefix for the LAN router device and the network assigned prefix as a LAN prefix for the LAN router device, creating a second prefix based on a second subset of bits from the network assigned prefix, performing prefix based routing using the second prefix created by the CPE as a CPE LAN prefix for the CPE, receiving an identity association for non-temporary address (IANA) request from the LAN router device, receiving an identity association for prefix delegation (IAPD) request from the LAN router device, creating a second prefix based on a second subset of bits from the network assigned prefix, and/or performing prefix based routing using the second prefix created by the CPE as a CPE LAN prefix for the CPE. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

The disclosed CPE/ODU/UE devices may be used to improve network configuration systems that have cellular network access points, such as base stations, which may provide a single prefix (e.g. a 64-bit prefix) to the CPE. Such systems may not be configured to support IPv6 prefix delegation, particularly when used to bridge a 5G or mmWave network system. By providing a CPE device that generates prefixes based upon the received single network-assigned prefix, the CPE may provide end-to-end IPv6 functionality to any attached device, such as an IDU. In addition, such CPEs may be configured to ensure that all IPv6 traffic transmitted to a base station utilizes the network-assigned prefix supplied by the base station. Doing so may prevent a cellular network from potentially tearing down a data call if the base station receives IP packets with an IPv6 prefix that was not assigned to the CPE. Doing so may also prevent a cellular network from restructuring its base station infrastructure to support IPv6 prefix delegation, which may be a difficult task, and may result in base stations becoming inactive while installation professionals update base station infrastructure.

Using such a system, a CPE may assign a dummy prefix to a router LAN in addition to assigning a dummy prefix to a router WAN. However, doing so may lead to IPv6 NAT for the LAN clients, which includes more processing by the CPE. In some aspects, it may be more efficient to assign the network-assigned prefix to the router LAN clients. By assigning the network-assigned prefix to the LAN clients, the CPE may eliminate, or skip, NAT for LAN clients. NAT may be used for the router WAN interface IPv6 addresses created using the dummy prefix.

In an aspect of the disclosure, a method of wireless communication at a customer premises equipment (CPE) may include receiving, over a first connection with a wireless network, an IPv6 address including a network assigned prefix for the CPE; creating a first prefix based on a subset of bits from the network assigned prefix; and transmitting, over a second connection with a local area network (LAN) device, the first prefix created by the CPE as a wide area network (WAN) prefix for the LAN router device and the network assigned prefix as a LAN prefix for the LAN router device. By generating the first prefix based on a subset of bits from the network-assigned prefix, the CPE may provide a different prefix to the LAN router device while preventing packets from potentially being lost if the generated prefix did not share the subset of bits.

The LAN router device may be a router indoor unit (IDU) and the CPE may be an outdoor unit (ODU) that provides a connection between the router IDU and a wireless wide area network (WWAN). Cellphone WWAN systems may be able to provide network connectivity using an ODU-IDU network infrastructure in a cheaper and more efficient manner as compared with other network infrastructure, such as a cable or a satellite ISP, depending upon the location of the building where the ODU-IDU network infrastructure is set up.

The first prefix created by the CPE and transmitted to the LAN router device may include a dummy network prefix based on any number of bits, such as 56 bits, from the 64-bit network assigned prefix. The first prefix may be created based on a first subset of bits from the network assigned prefix. With such a first prefix, the CPE may create a second prefix based on a second subset of bits from the network assigned prefix. The CPE may also perform prefix-based routing using the second prefix created by the CPE as a CPE LAN prefix for the CPE. By generating two such prefixes, the CPE may be able to create two dummy networks that may be used to designate multiple device destinations for packets using an IPv6 protocol. One dummy network could be used to designate multiple prefixes for the CPE, while another dummy network could be used to designate multiple prefixes for an IDU functionally connected to the CPE network.

The method may also include receiving an identity association for a non-temporary address (IANA) request from the LAN router device; and receiving an identity association for prefix delegation (IAPD) request from the LAN router device. Transmitting the first prefix and the network-assigned prefix to the LAN router device may include transmitting the first prefix in response to the IANA request and transmitting the network assigned prefix in response to the IAPD request. Transmitting the first prefix and the network assigned prefix to the LAN router device may also include transmitting the first prefix in a router advertisement. Configuring the CPE to broadcast the first prefix in a router advertisement and also use the first prefix to construct an IANA address in response to requests allows an out-of-the-box router without specialized configuration to self-assign a plurality of IPv6-compliant network addresses using either standard DHCP or Auto-Configuration settings.

The method may also include performing network address translation (NAT) for uplink traffic from any device using the dummy prefix (e.g. a router WAN interface) to translate between the first prefix and the network assigned prefix. Providing NAT services, particularly SNAT and DNAT services, allows for the CPE to maintain its custom IPv6 infrastructure using its generated prefixes without performing a special configuration on either a network base station that provides Internet connectivity to the CPE nor on a standard IDU router that is connected to a plurality of IPv6-compliant devices.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication at a CPE, including receiving, over a first connection with a wireless network, a network assigned prefix for the CPE. The method of wireless communication at the CPE further includes creating a first prefix based on a subset of bits from the network assigned prefix. The method of wireless communication at the CPE further includes transmitting, over a second connection with a LAN device, the first prefix created by the CPE as a WAN prefix for the LAN router device and the network assigned prefix as a LAN prefix for the LAN router device.

Aspect 2 is the method of aspect 1, wherein the LAN router device is an IDU, and the CPE is an ODU or UE that provides a connection between the router IDU and a WWAN.

Aspect 3 is the method of any of aspects 1 or 2, wherein the network assigned prefix comprises a 64-bit network assigned prefix for an IPv6 connection, and the first prefix includes less than 64 bits from the network assigned prefix and remaining bits as dummy bits.

Aspect 4 is the method of aspect 3, wherein the first prefix is created based on a first subset of bits from the network assigned prefix. The method of wireless communication at the CPE further includes creating a second prefix based on a second subset of bits from the network assigned prefix. The method of wireless communication at the CPE further includes performing prefix-based routing using the second prefix created by the CPE as a CPE LAN prefix for the CPE.

Aspect 5 is the method of aspect 4, wherein the second subset of bits is less than the first subset of bits and overlaps with the first subset of bits of the network assigned prefix.

Aspect 6 is the method of any of aspects 1 to 5, further including receiving a DHCPv6 request including an IANA request and an IAPD request from the LAN router device, wherein transmitting the first prefix and the network assigned prefix to the LAN router device includes transmitting the first prefix in response to the IANA request and transmitting the network assigned prefix in response to the IAPD request.

Aspect 7 is the method of any of aspects 1 to 6, wherein transmitting the first prefix and the network assigned prefix to the LAN router device includes transmitting the first prefix in a router advertisement.

Aspect 8 is the method of any of aspects 1 to 7, further including performing IPv6 network address translation (NAT) for uplink traffic from a WAN port of the LAN router device to translate between the first prefix and the network assigned prefix.

Aspect 9 is an apparatus for wireless communication at a CPE, including a memory and at least one processor coupled to the memory, the memory and the at least one processor configured to implement any of aspects 1 to 8.

In aspect 10, the apparatus of aspect 9 further includes at least one antenna coupled to the at least one processor.

In aspect 11, the apparatus of aspect 9 or aspect 10 further includes a transceiver coupled to the at least one processor.

Aspect 12 is an apparatus for wireless communication including means for implementing any of aspects 1 to 8.

In aspect 13, the apparatus of aspect 12 further includes at least one antenna coupled to the means for implementing any of aspects 1 to 8.

In aspect 14, the apparatus of aspect 12 or aspect 13 further includes a transceiver.

Aspect 15 is a non-transitory computer-readable medium storing computer executable code, where the code when executed by a processor causes the processor to implement the method of any of aspects 1 to 8.

What is claimed is:

1. A method of wireless communication at a customer premises equipment (CPE), comprising:
   receiving, over a first connection with a wireless network, a network assigned prefix for the CPE;
   creating a first prefix based on a subset of bits from the network assigned prefix;
   transmitting, over a second connection with a local area network (LAN) router device, the first prefix created by the CPE as a wide area network (WAN) prefix for the LAN router device and the network assigned prefix as a LAN prefix for the LAN router device; and
   communicating with the LAN router device using the first prefix as the WAN prefix for the LAN router device and the network assigned prefix as the LAN prefix for the LAN router device.

2. The method of claim 1, wherein the LAN router device is an indoor device unit (IDU), and the CPE is an outdoor device unit (ODU) or user equipment (UE) that provides a connection between the IDU and a wireless wide area network (WWAN).

3. The method of claim 1, wherein the network assigned prefix comprises a 64 bit network assigned prefix for an Internet Protocol version 6 (IPv6) connection, and the first prefix includes less than 64 bits from the network assigned prefix and remaining bits as dummy bits.

4. The method of claim 3, wherein, creating the first prefix comprises creating the first prefix based on a first subset of bits from the network assigned prefix, the method further comprising:
   creating a second prefix based on a second subset of bits from the network assigned prefix; and
   assigning an address to a LAN gateway interface of the CPE based on the second prefix.

5. The method of claim 4, wherein the second subset of bits is less than the first subset of bits and overlaps with the first subset of bits of the network assigned prefix.

6. The method of claim 1, further comprising:
   receiving a DHCPv6 request including a first identity association for non-temporary address (IANA) request and a second identity association for prefix delegation (IAPD) request from the LAN router device,
   wherein transmitting the first prefix and the network assigned prefix to the LAN router device includes transmitting the first prefix in response to the IANA request and the network assigned prefix in response to the IAPD request.

7. The method of claim 1, wherein transmitting the first prefix and the network assigned prefix to the LAN router device includes transmitting the first prefix in a router advertisement (RA).

8. The method of claim 1, further comprising:
performing Internet Protocol version 6 (IPv6) network address translation (NAT) for first uplink traffic from the LAN router device to translate between the first prefix and the network assigned prefix for first communication based on the first prefix; and
foregoing performing IPv6 NAT for second uplink traffic from the LAN router device for second communication based on the network assigned prefix.

9. An apparatus for wireless communication at a customer premises equipment (CPE), comprising:
at least one memory; and
at least one processor coupled to the at least one memory and, based at least in part on instructions stored in the at least one memory, the at least one processor is configured to:
receive, over a first connection with a wireless network, a network assigned prefix for the CPE;
create a first prefix based on a subset of bits from the network assigned prefix;
transmit, over a second connection with a local area network (LAN) router device, the first prefix created by the CPE as a wide area network (WAN) prefix for the LAN router device and the network assigned prefix as a LAN prefix for the LAN router device; and
communicate with the LAN router device via the first prefix as the WAN prefix for the LAN router device and the network assigned prefix as the LAN prefix for the LAN router device.

10. The apparatus of claim 9, wherein the LAN router device is a router indoor unit (IDU), and the CPE is an outdoor unit (ODU) or user equipment (UE) that provides a connection between the IDU and a wireless wide area network (WWAN).

11. The apparatus of claim 9, wherein the network assigned prefix comprises a 64 bit network assigned prefix for an Internet Protocol version 6 (IPv6) connection, and the first prefix includes less than 64 bits from the network assigned prefix and remaining bits as dummy bits.

12. The apparatus of claim 11, wherein, to create the first prefix, the at least one processor is configured to create the first prefix based on a first subset of bits from the network assigned prefix, wherein the at least one processor is further configured to:
create a second prefix based on a second subset of bits from the network assigned prefix; and
assign an address to a LAN gateway interface of the CPE based on the second prefix.

13. The apparatus of claim 12, wherein the second subset of bits is less than the first subset of bits and overlaps with the first subset of bits of the network assigned prefix.

14. The apparatus of claim 9, wherein the at least one processor is further configured to:
receive a DHCPv6 request including a first identity association for non-temporary address (IANA) request and a second identity association for prefix delegation (IAPD) request from the LAN router device; and
transmit the first prefix in response to the IANA request and the network assigned prefix in response to the IAPD request.

15. The apparatus of claim 9, wherein, to transmit the first prefix and the network assigned prefix to the LAN router device, the at least one processor is further configured to:
transmit the first prefix in a router advertisement (RA).

16. The apparatus of claim 9, wherein the at least one processor is further configured to:
perform Internet Protocol version 6 (IPv6) network address translation (NAT) for first uplink traffic from a WAN port of the LAN router device to translate between the first prefix and the network assigned prefix for first communication based on the first prefix; and
forego performing IPv6 NAT for second uplink traffic from the LAN router device for second communication based on the network assigned prefix.

17. An apparatus for wireless communication at a customer premises equipment (CPE), comprising:
means for receiving, over a first connection with a wireless network, a network assigned prefix for the CPE;
means for creating a first prefix based on a subset of bits from the network assigned prefix;
means for transmitting, over a second connection with a local area network (LAN) router device, the first prefix created by the CPE as a wide area network (WAN) prefix for the LAN router device and the network assigned prefix as a LAN prefix for the LAN router device; and
means for communicating with the LAN router device using the first prefix as the WAN prefix for the LAN router device and the network assigned prefix as the LAN prefix for the LAN router device.

18. The apparatus of claim 17, wherein the LAN router device is a router indoor unit (IDU), and the CPE is an outdoor unit (ODU) or user equipment (UE) that provides a connection between the IDU and a wireless wide area network (WWAN).

19. The apparatus of claim 17, wherein the network assigned prefix comprises a 64 bit network assigned prefix for an Internet Protocol version 6 (IPv6) connection, and the first prefix includes less than 64 bits from the network assigned prefix and remaining bits as dummy bits.

20. The apparatus of claim 19, wherein the means for creating the first prefix comprises means for creating the first prefix based on a first subset of bits from the network assigned prefix, the apparatus further comprising:
means for creating a second prefix based on a second subset of bits from the network assigned prefix; and
means for assigning an address to a LAN gateway interface of the CPE based on the second prefix.

21. The apparatus of claim 20, wherein the second subset of bits is less than the first subset of bits and overlaps with the first subset of bits of the network assigned prefix.

22. The apparatus of claim 17, further comprising:
means for receiving a DHCPv6 request including a first identity association for non-temporary address (IANA) request and a second identity association for prefix delegation (IAPD) request from the LAN router device, wherein the means for transmitting the first prefix and the network assigned prefix to the LAN router device includes means for transmitting the first prefix in response to the IANA request and the network assigned prefix in response to the IAPD request.

23. The apparatus of claim 17, wherein the means for transmitting the first prefix and the network assigned prefix to the LAN router device includes means for transmitting the first prefix in a router advertisement (RA).

24. The apparatus of claim 17, further comprising:
means for performing Internet Protocol version 6 (IPv6) network address translation (NAT) for first uplink traffic from a WAN port of the LAN router device to translate between the first prefix and the network assigned prefix for first communication based on the first prefix; and
means for foregoing performing IPv6 NAT for second uplink traffic from the LAN router device for second communication based on the network assigned prefix.

25. A computer-readable medium storing computer executable code at a customer premises equipment (CPE), the code when executed by at least one processor causes the CPE to:
receive, over a first connection with a wireless network, a network assigned prefix for the CPE;
create a first prefix based on a subset of bits from the network assigned prefix;
transmit, over a second connection with a local area network (LAN) router device, the first prefix created by the CPE as a wide area network (WAN) prefix for the LAN router device and the network assigned prefix as a LAN prefix for the LAN router device; and
communicate with the LAN router device based on the first prefix as the WAN prefix for the LAN router device and the network assigned prefix as the LAN prefix for the LAN router device.

26. The computer-readable medium of claim 25, wherein the LAN router device is a router indoor unit (IDU), and the CPE is an outdoor unit (ODU) or user equipment (UE) that provides a connection between the IDU and a wireless wide area network (WWAN).

27. The computer-readable medium of claim 25, wherein the network assigned prefix comprises a 64 bit network assigned prefix for an Internet Protocol version 6 (IPv6) connection, and the first prefix includes less than 64 bits from the network assigned prefix and remaining bits as dummy bits.

28. The computer-readable medium of claim 27, wherein, to create the first prefix, the code when executed by the at least one processor causes the CPE to create the first prefix based on a first subset of bits from the network assigned prefix, wherein the code when executed by the at least one processor further causes the at least one processor to:
create a second prefix based on a second subset of bits from the network assigned prefix; and
assign an address to a LAN gateway interface of the CPE based on the second prefix.

29. The computer-readable medium of claim 28, wherein the second subset of bits is less than the first subset of bits and overlaps with the first subset of bits of the network assigned prefix.

30. The computer-readable medium of claim 25, the code when executed by the at least one processor further causes the CPE to:
receive a DHCPv6 request including a first identity association for non-temporary address (IANA) request and a second identity association for prefix delegation (IAPD) request from the LAN router device;
wherein, to transmit the first prefix and the network assigned prefix, the code when executed by the at least one processor causes the at least one processor to transmit the first prefix in response to the IANA request and the network assigned prefix in response to the IAPD request.

\* \* \* \* \*